US011161457B2

(12) United States Patent
Wieczorek et al.

(10) Patent No.: US 11,161,457 B2
(45) Date of Patent: Nov. 2, 2021

(54) PIVOTABLE INTERIOR REARVIEW DEVICE FOR A MOTOR VEHICLE

(71) Applicant: SMR Patents S.à.r.l., Luxembourg (LU)

(72) Inventors: Romeo Wieczorek, Stuttgart (DE); Peter Hein, Stuttgart (DE); Ilka Rötzer, Stuttgart (DE); Andreas Herrmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 265 days.

(21) Appl. No.: 16/201,544

(22) Filed: Nov. 27, 2018

(65) Prior Publication Data

US 2019/0092242 A1 Mar. 28, 2019

Related U.S. Application Data

(63) Continuation-in-part of application No. 15/301,531, filed as application No. PCT/IB2015/052439 on Apr. 2, 2015, now Pat. No. 10,144,354.

(30) Foreign Application Priority Data

Apr. 3, 2014 (EP) .................................... 14163459
Aug. 16, 2018 (DE) ............................ 102018119948

(51) Int. Cl.
*B60R 1/08* (2006.01)
*G06F 3/01* (2006.01)
(Continued)

(52) U.S. Cl.
CPC ............... *B60R 1/087* (2013.01); *B60R 1/04* (2013.01); *B60R 1/12* (2013.01); *G06F 3/017* (2013.01);
(Continued)

(58) Field of Classification Search
CPC .. B60R 1/04; B60R 1/087; B60R 1/12; B60R 2001/1223; B60R 1/00; B60R 2300/8026;
(Continued)

(56) References Cited

U.S. PATENT DOCUMENTS

| 8,396,252 B2 | 3/2013 | El Dokor |
| 9,008,369 B2* | 4/2015 | Schofield ............... G08G 1/166 382/104 |
| 2008/0077882 A1* | 3/2008 | Kramer .................. B60K 35/00 715/810 |

(Continued)

FOREIGN PATENT DOCUMENTS

| DE | 102011089195 A1 | 1/2013 |
| EP | 0286401 A2 | 12/1988 |

(Continued)

OTHER PUBLICATIONS

International Search Report dated Oct. 23, 2015 of International application No. PCT/IB2015/052439.
(Continued)

*Primary Examiner* — Behrang Badii
*Assistant Examiner* — Daniel L Greene
(74) *Attorney, Agent, or Firm* — Jones Day

(57) ABSTRACT

A pivotable interior rearview device for a motor vehicle includes a mirror surface provided by at least one of a reflective element and a display element, a first sensor device suitable for a light propagation time measurement for detecting at least one gesture by a driver of the motor vehicle incidence of light on the mirror surface, a switching device for switching the display element on and off, a pivoting device for pivoting the mirror surface from a normal position into at least one dimming position in which dazzling of the driver by light reflected in the mirror surface is reduced, and a control unit for controlling at least one of the switching device and the pivoting device. A method of using the rearview device is also described.

33 Claims, 12 Drawing Sheets

(51) Int. Cl.
  *H04N 17/00* (2006.01)
  *B60R 1/12* (2006.01)
  *B60R 1/04* (2006.01)
  *G06T 7/00* (2017.01)

(52) U.S. Cl.
  CPC .... *H04N 17/002* (2013.01); *B60R 2001/1223* (2013.01); *G06T 7/0002* (2013.01); *G06T 2207/30168* (2013.01)

(58) Field of Classification Search
  CPC ........... G06F 3/017; G06T 2207/30168; G06T 7/0002; H04N 17/002
  See application file for complete search history.

(56) References Cited

U.S. PATENT DOCUMENTS

| | | | | |
|---|---|---|---|---|
| 2011/0123961 | A1* | 5/2011 | Staplin | G09B 9/052 434/64 |
| 2011/0222176 | A1* | 9/2011 | Browne | B60R 1/074 359/846 |
| 2012/0229882 | A1* | 9/2012 | Fish, Jr. | B60R 1/06 359/267 |
| 2014/0232869 | A1* | 8/2014 | May | G06T 7/70 348/148 |
| 2014/0241589 | A1* | 8/2014 | Weber | G06T 5/004 382/108 |
| 2015/0298657 | A1* | 10/2015 | Kanter | B60R 1/00 348/148 |
| 2016/0129851 | A1* | 5/2016 | Werner | B60K 35/00 701/49 |

FOREIGN PATENT DOCUMENTS

| | | |
|---|---|---|
| EP | 1013503 A1 | 6/2000 |
| EP | 1593550 A1 | 9/2005 |

OTHER PUBLICATIONS

Written Opinion dated Oct. 23, 2015 of International application No. PCT/IB2015/052439.
European Search Report dated Sep. 1, 2014 of EP 14163459.

* cited by examiner

PIVOTABLE INTERIOR REARVIEW DEVICE FOR A MOTOR VEHICLE

CROSS-REFERENCE TO RELATED APPLICATIONS

This application is a continuation-in-part of U.S. patent application Ser. No. 15/301,531, which is a National Stage Entry of International Patent Application No. PCT/IB2015/052439, filed Apr. 2, 2015, which claims the benefit of European Patent Application No. EP14,163,459.2, filed Apr. 3, 2014, and this application claims the benefit of foreign priority to German Patent Application No. DE10,2018/119,948, filed Aug. 16, 2018, each of which is hereby incorporated by reference in their entirety for all purposes.

BACKGROUND OF THE INVENTION

1. Field of the Invention

The following description relates to a pivotable rear view device for a motor vehicle, a rear view device with such a pivotable interior mirror, and a method for using such an interior mirror. In addition, the rear view device may include a camera arrangement for recording a rear traffic situation.

2. Description of Related Art

Driver assistance systems perceive the surroundings of a motor vehicle on the basis of environmental sensors by means of radar, video, infrared and ultrasound, and interpret them. They provide assistance to the driver in many driving situations and thus increase driving comfort and driving safety. Driver assistance systems contribute to increased safety by providing assistance to a driver in critical situations in which quick and confident action is required. In hazardous situations in which, for example, the driver's reaction times are impaired by the sudden occurrence of glare from a motor vehicle driving behind them, assistance for the driver from technical aids is desirable.

EP1 593 550 A1 describes an interior mirror for a motor vehicle with a support arm which can be mounted in a motor vehicle and with an adjuster which is adjustably positioned on the support arm where a mirror is attached directly or indirectly to the adjuster, the mirror can be adjusted between a normal position and a dimming position through actuation of the adjuster, there is a drive device intended for actuating the adjuster, and there is at least one elastic tensioning element with which the adjuster is elastically tensioned in the normal position and/or the dimming position. The drive device can be controlled by a light-sensitive sensor, in particular a differential light sensor. A circuit for adjustment of an interior mirror between a normal position and a dimming position is described by EP0 286 401 A2.

A motor vehicle mirror, as described by EP1 013 503 A1, has a supporting body for a reflective panel which can be moved under the action of a spring in order to be moved into a dimming position after activation of a shape memory wire.

DE10 2011 089 195 A1 describes a device and a method for touch-free sensing of objects and/or persons in order to execute a desired operating action.

Rear view devices such as rear view mirrors with a reflective surface in or on motor vehicles make it easier for the driver of the motor vehicle to observe a rear traffic situation and make driving a motor vehicle safer. The goal of rear view devices is to make the largest possible area behind the vehicle visible. In modern motor vehicles, reflective rear view devices are increasingly being supplemented or entirely replaced by camera arrangements, wherein the image recorded by a camera is shown to the driver on a corresponding screen or monitor. Here, the recording camera is usually exposed to weather and other contaminating influences. In order for the rear view device to be able to reliably show the rear traffic situation, it must be ensured that with the cameras used, no potential dirt residues on the camera itself or on transparent protective covers arranged in the optical path to the camera prevent the recording of the rear traffic situation or at least impair it to the extent that the driver can no longer observe the rear traffic situation with the required clarity. For this purpose, camera arrangements can be equipped with rear view devices that are designed to guarantee the reliable recording of a clear image of the rear view traffic situation while driving the motor vehicle. Even so, contamination of the camera arrangement can, for example as a result of dirt that is sprayed up, suddenly lead to a loss of the complete view of the traffic situation. This may lead to incorrect reactions by the driver and thus to critical traffic situations. Other causes, alone or in combination, can negatively affect a display of the traffic situation though the camera arrangement.

It would therefore be desirable to have a rear view device using a camera in which impairment of the camera image does not lead to inability to observe rear traffic situations and critical traffic situations due to an inadequate camera image.

SUMMARY

In one aspect, a pivotable interior mirror for a motor vehicle which is equipped with a mirror surface in the form of a sensor device suitable for a light propagation time measurement for sensing at least one gesture of a driver of the vehicle and/or light incident on the first surface of the wedge mirror, and a pivoting device for pivoting the mirror surface from a normal position into at least one dimming position in which blinding of the driver by light reflected at the mirror surface is reduced, where the pivoting device can be activated depending on at least one output signal of the sensor device, where the sensor device is suitable for a light propagation time measurement and is a part of a control unit for the pivoting device, and where the control unit detects movement patterns within a first area of the interior mirror and/or provides at least one virtual button within a second area of the interior mirror.

The sensor device may include at least one first sensor in the form of a TOF sensor, in particular including a TOF camera, where the sensor device preferably also includes at least one second sensor in order to fulfil an ALS function.

The first sensor can be attached to the side of the interior mirror presenting the mirror surface, in particular to the mirror surface, and/or a first second sensor can be attached to the side of the interior mirror presenting the mirror surface, in particular to the mirror surface, and/or a second second sensor can be attached to the side of the interior mirror opposite the mirror surface, in particular to the surface of the wedge mirror opposite the mirror surface, wherein the first sensor and the first second sensor are preferably shaped as one.

The pivoting device can be activated depending on a comparison of the output signals from the first and at least one second sensor, preferably through subtraction, and/or the pivoting device can be activated in dependence on a comparison of the output signals from the first second and second second sensor, preferably through subtraction.

The pivoting device can be activated in dependence on signals from a device in the motor vehicle which is characteristic of the lighting conditions in the environment of the vehicle, in particular including an illuminating device for the vehicle, for example in the form of headlights and/or vehicle interior lighting and/or an internal clock and/or a positioning device.

The control unit may detect movement patterns on the mirror surface within a first distance interval and/or provides at least one virtual button within a second distance interval wherein the first distance interval is provided in the first area of the control unit and the second distance interval is provided in the second area of the control unit.

The second distance interval can be positioned closer to the mirror surface than the first distance interval.

The pivoting device may include a shape memory actuator for pivoting the mirror surface, wherein the shape memory actuator preferably comprises a shape memory wire which changes in length in response to a current flow through the shape memory wire.

The control unit may be designed to supply the shape memory wire with current, in particular from a vehicle power supply.

The shape memory wire may be coiled on a first thread roll and causes a rotational movement of the first thread roll in response to the current flow, where the first thread roll preferably forms a drive axle in the interior mirror and is designed to rotate the mirror surface by at least a first angle of rotation.

The shape memory wire may be coiled into a second thread roll which is designed to rotate the mirror surface by at least a second angle of rotation, wherein the diameter of the second thread roll preferably differs from the diameter of the first thread roll.

The pivoting device may include a further actuator which is designed to move the mirror surface back into the normal position, where the further actuator includes a second shape memory actuator or a spring element.

In another aspect, a motor vehicle includes a pivotable interior mirror which includes a control device in connection with the sensor device, the control unit, a device which is characteristic of the lighting conditions in the environment of the vehicle, an illuminating device, for example in the form of headlights, and/or vehicle interior lighting, an internal clock and/or a positioning device.

In another aspect, a method for pivoting a pivotable interior mirror includes detecting movement by a driver of a motor vehicle, in particular an arm movement by the driver towards the interior mirror or a finger movement within a specific area of the interior mirror and/or the incidence of light on the interior mirror; and triggering a movement of the interior mirror from a normal position into at least one dimming position and/or from the dimming position into the normal position depending on the result of the detection.

A vehicle function such as the setting of an illumination device and/or time information and/or a vehicle position may be taken into account in the change from the normal position to the dimming position, and/or a driver of the vehicle can choose whether the change from the normal position into the dimming position and/or from the dimming position into the normal position occurs automatically, by means of gesture control or through actuation of a virtual button, where an automatic change is preferably initiated when specific, predefined lighting conditions are detected.

A dazzling effect can be cause by the interior mirror in a motor vehicle as a result of a vehicle driving behind the motor vehicle, particularly in the dark. If the interior mirror is turned to a dimming position, then the beam path is interrupted and the dazzling effect no longer occurs. In order to make the turn down easy and safe, an interior mirror may include a pivoting device which is designed to move the interior mirror from a normal position into a dimming position, wherein dazzling of the driver via the interior mirror is reduced in the dimming position. Furthermore, such an interior mirror may have a sensor device which includes a control unit, for example, and which is designed to activate the pivoting device either automatically or in response to a movement by the driver. The motion-controlled activation thereby occurs by means of gesture control by the driver, for example as a result of a movement of the driver's arm or hand towards the interior mirror, or through actuation of a virtual button.

The following abbreviations and terms are used in order to describe the invention in detail:

SMA: Shape memory alloys (SMA), often also referred to as "memory metals" are special metals which can exist with two different crystalline structures and can seemingly "remember" a previous shape despite significant subsequent shaping.

LED: Light-emitting diode.

EC glass: Anti-glare electrochromic mirror glass.

TOF: Time of flight—TOF sensors represent a sensor device for measuring distance by means of determination of time of flight.

ALS: Ambient light sensor—sensors with an ALS function allow for brightness detection similar to a human eye.

An interior mirror with dimming function and gesture control which is very easy to operate for a driver is described below. In particular, the driver can start the actuator for a pivoting device with the help of gesture control through a simple hand movement towards the interior mirror, the pivoting device thus moving the mirror into a position in which the driver is no longer dazzled. The mirror can be moved silently through the use of an SMA actuator. In addition, this is significantly more cost-effective to produce than a mirror with EC glass.

An example advantage of a gesture controlled interior mirror is that the driver of the motor vehicle can turn the interior mirror down with a simple movement in situations in which they are being dazzled by a vehicle driving behind them so that they are no longer dazzled. They can therefore reduce or entirely stop the glare by means of a simple gesture control independently of the visual perception which is impaired by the glare and remove themselves from the hazardous situation. The pivotable interior rear view device is easy to operate. Just a simple movement of the arm or hand towards the interior mirror is sufficient to turn the interior mirror down.

The sensor which is used to detect a movement by the driver may be a TOF sensor so it is suitable for light propagation time measurement. Such a sensor can be combined with an ALS sensor in order to detect both intensity and distance, whereby differentiation can be made between a passenger and a driver so that movements by a passenger can thus be ignored. Furthermore, the sensor responds equally to an object in black or white, and thus to a hand with or without a black glove, and is therefore ideal for detecting a driver's gesture.

In addition, a further ALS sensor can detect the brightness outside the motor vehicle, i.e. the amount of light which is reaching the driver through the windscreen of their motor vehicle. By comparing this light with the light reflected by the interior mirror, an improvement can be achieved by turning it down. It is therefore also possible for the system to react to driving into or out of a tunnel.

In another aspect, a rear view device using a camera arrangement is provided where an impairment of the camera image leading to poor observation of rear traffic situations does not result in inability to observe the rear traffic situation.

In an aspect, a rear view device for a motor vehicle includes a camera arrangement for recording a rear traffic situation and an output unit connected with the camera arrangement on which the rear traffic situation recorded with the camera arrangement is shown as a camera image at least for a driver of the motor vehicle, where the output unit is a partially reflective output unit at least in sections, which without a shown camera image visibly displays a conventional mirror image of the rear traffic situation, at least in sections of the output unit, and when switched on shows a camera image with suitable image properties which render the conventional mirror image at least mainly invisible, and where the rear view device additionally includes a control unit for determining a degree of impairment of the camera image, where, when a predetermined degree of impairment of the camera image is exceeded, the control unit automatically controls the output unit such that the camera image is no longer shown on the output unit, and instead the output unit displays the rear traffic situation by means of a conventional mirror image.

The state of the output unit, where the camera is no longer shown on the output unit, may correspond to a state in which the output unit is switched off. However, for a state without a shown camera image, the output unit may not necessarily need to be switched off, but can also merely not provide a camera image, for example in so-called standby mode. The rear view device with output unit can here be arranged within the passenger compartment as a camera-supported interior rear view mirror, outside the passenger compartment as a camera-supported outside rear view mirror or as a rear view device arranged elsewhere. The expression "output unit" describes all devices suitable for showing (displaying) camera images. The output unit can here be designed as a separate appliance or a unit integrated in a housing or a component of the motor vehicle. In one embodiment, the output unit is a screen or monitor.

The control unit of the rear view device may determine the degree of impairment of the camera image integrally for the entire image area of the camera image, or locally for selected positions or for individual pixels of the camera image or for a plurality of sub-areas in the camera image. The control unit may be a computer chip with a corresponding evaluation algorithm which is installed and implemented on it for determining the degree of impairment of a camera image. Corresponding image evaluation software can be used. In addition, reaction sequences may be installed so that the control unit can automatically control the output unit based on the results of the evaluation algorithm. The term "partially reflective" here denotes a reflection capacity of the displaying surface of the output unit, which is set such that the intensity of the mirror image reflected from the displaying surface is suitably lower than the intensity of the camera image emitted by the output unit, so that the observer, here for example the driver, mainly perceives the camera image shown when both images are overlaid, or only perceives it instead of the mirror image. The output unit can be partially reflective in areas (sections smaller than the total surface of the output unit) or over the entire area. The output unit may no longer show the camera image when a degree of impairment of the camera image is too great, the camera arrangement can be switched off, and/or the camera signal can be suppressed or switched off as an input signal for the output unit. Impairments to the camera image can be caused by local contamination on the camera arrangement, by image errors due to electronic faults or by pixel errors of the output unit or the failure of image lines in the output unit. The impairment of the camera image can also be caused by overlapping different reasons, for example, sections of the camera image cannot display the rear traffic situation due to contamination, while at the same time, other areas may have other image errors, so that the total degree of impairment is so high that the representation of the camera image on the output unit is switched off in favor of the representation by means of the mirror image.

The checking for any impairment to the camera image may ensure that through the shown camera image, the recorded rear traffic situation is clearly and distinctly displayed. If the camera image no longer has this quality, the switching off of the camera image and the depiction of the rear traffic situation by the reflection of the light on the output unit that enters from behind, for example on the displaying surface of the output unit, provides a reliable and adequate opportunity for the driver of the motor vehicle, for example, to continue to observe the rear traffic situation without a loss of information.

The rear view device makes it possible that with an impairment of the camera image that is not tolerable, the opportunity for observing the rear traffic situation is not lost, and the occurrence of the resulting critical traffic situations is avoided.

The degree of contamination of the camera image may arise (a) due to contamination of the camera arrangement and/or (b) due to one or more faults, not caused by contamination, from the group of a low charging status of an electrical battery in an electric vehicle, a juddering camera image, a flickering camera image, a wobbly camera image, a still image or an EMI effect. A contamination of the camera arrangement may also suddenly occur at any time during a journey of the motor vehicle (driving through a puddle, etc.) and may be a major source of error with regard to the impairment of camera images in a rear view device. The control unit here evaluates both the degree of contamination in the camera image of the camera arrangement and accordingly controls the output unit depending on the determined degree of contamination, as specified. The predetermined degree of contamination may be exceeded when 20% or more of the total camera image is covered by dirt. The predetermined degree of contamination may also be exceeded when 10% or more of the camera image is covered in certain areas, for example, in the area around the center of the image. The percentages here relate to the proportion of the impaired area of the camera image in relation to its total area on the output unit. "Covered" can also mean that the transmission of the actual camera image is more than 50% lower than in non-contaminated areas due to the contamination. An area may be covered when the transmission amounts to less than 10% of the transmission in non-covered areas, for example with 0% transmission. With other faults that are not caused by contamination, which can impair the observation of the rear traffic situation, the camera image may also no longer be shown on the output unit. An EMI effect denotes electromagnetic interference signals that penetrate into the system from outside and which can generate problems, be it via a mobile phone, a radio mast, or similar. The predetermined degree of contamination can, for example, be exceeded when 20% or more of the entire camera image can no longer be shown due to these interferences. The predetermined degree of contamination can, for example, also be exceeded when 10% or more of the camera image is subject to interference in certain areas such as in the area around the center of the image. This may further increase safety in road traffic when the driver is not erroneously offered an incorrect or non-current image of the rear traffic situation. The control unit may immediately emit a signal to the output unit and switch it off when a fault is detected.

The control unit may be designed to separately determine the degree of contamination of the camera image in a two-dimensional arrangement on measurement areas in the camera image for each measurement area. The term "measurement area" denotes an area of the camera image that shows a section or sub-image of the entire camera image. Measurement areas that are adjacent to each other can have the same degree of contamination but can also have significantly different degrees of contamination. Due to the degrees of contamination determined separately for the individual measurement areas, a position-dependent relevance of the impairment of the observability of the rear traffic situation can be determined in addition to an integral degree of impairment.

The two-dimensional arrangement of measurement areas covers the entire camera image. Thus, every form of impairment can be recorded and evaluated, regardless of its position.

The measurement areas may be arranged over the camera image as squares or rectangles with an edge ratio between the small and large edge of more than 50%. Thus, the measurement areas may have a regular form so that a matrix can be formed on measurement areas which can evenly cover the entire camera image, for example, so that all sections of the camera image are evaluated on the basis of the measurement areas.

The two-dimensional arrangement may include a central main field of several measurement areas which cover a central area of the camera image. The term "central area" denotes an area around the center of the camera image. Thus, the measurement areas in the center of the camera image can be particularly weighted for determining a degree of impairment, since the image center delivers the greater amount of information for the observation of the traffic situation.

The control unit may be designed to regard one of the measurement areas as being unreliable when the predetermined degree of impairment for this measurement area is exceeded. In impermissibly impaired measurement areas, the rear traffic situation may be no longer observable to the necessary degree of safety during driving. Here, the reason for the impairment can possibly vary from measurement area to measurement area. For example, some measurement areas can no longer correctly show the rear traffic situation due to dirt on the camera arrangement, while other measurement areas may also no longer be able to correctly show the rear traffic situation due to image errors, pixel errors, etc.

The control unit may be designed to no longer show the camera image on the output unit when 20% or more of the measurement areas are regarded as being impermissibly impaired, or when 10% or more of the measurement areas in the central main field are regarded as being impermissibly impaired. The percentages may relate to the proportion of the impaired area of the camera image in relation to its total area on the output unit. For camera images with a higher degree of impairment, the safety risk due to unclear and/or incomplete depictions of the rear traffic situation may considerably increase with further use of the camera image in the rear view device. The weighting of impaired versus non-impaired areas with regard to the impact on the overall camera image shown may be simple and reliable, precisely with the weighting method specified above. The evaluation of the number of impaired measurement areas can be conducted on the basis of a certain impairment cause or for all different impairment causes. For example, a camera arrangement that is only contaminated to a low degree can cause a non-critical number of dirty measurement areas, so that a camera image can continue to precisely and reliably show the rear traffic situation and no increased safety risk is present while driving the motor vehicle. The same could also be the case with a lower number of image errors in the camera image. If additional image errors now occur with a slightly dirty camera arrangement or additional dirt on the camera arrangement with image errors that are already present, the entire degree of impairment could be too high, so that the camera image is no longer shown on the output unit and instead the mirror image takes over the representative function.

The control unit may be designed to continuously determine the degree of impairment of the camera image. Thus, during the operating period of the motor vehicle, it can be prevented at any time that the driver does not receive a representation of the rear traffic situation due to impairments that occur suddenly (such as dirt or sudden image errors). Thus, driving safety is guaranteed during the entire operating period and a shutting down of the vehicle is prevented. According to one norm, two mirrors should be ready for operation at all times such as one of the two outer mirrors and the interior mirror.

The output unit may be a full-surface partially reflective output unit which displays a conventional mirror image visibly over the entire output unit without the shown camera image. With this full-surface representation of the rear traffic situation, the driver may continue to maintain a good overview of the traffic situation even with a reflective display without a camera image. The visible representation means that the mirror image is visible for the observer in the absence of the camera image and the reflective capacity of the output unit is adapted accordingly for the purpose. However, the reflective capacity may not be so high that the mirror image overlays the camera image in an interfering manner when the camera image is shown.

A partially transparent film or layer with reflective properties can be applied in order for the output unit to receive its partially reflective property. The film may be applied on the side facing the observer. In order for this partially transparent layer or foil to be applied to the output unit, the output unit may be cleaned from dirt, dust, grease, fingerprints and/or other contamination in a suitable manner, at least on the side facing the later observer. The output unit may be inserted into an assembly machine, and its dimensions measured using a measuring device, at least with regard to the side to be coated with the film or layer. If a film is to be applied, the film may be cut to size, for example stamped from a partially transparent film, set in the correct place and positioned for the application step. The film and the representational surface of the output unit may then be moistened with a fluid and the damp film may be brought into contact with the moist representative surface and laminated to each other. Through a peeling off at the side and using an elastic roll, the film may be pressed onto the output unit and the film may be applied to the output unit free of air pockets. Remaining fluids may now be removed. The reflective layer thus applied may lie on the representative surface and by being measured may be adapted to the size of the output unit and its screen area precisely to size. The edges of the film or the output unit can then be hidden and affixed by a frame. The partially reflective film may be a reflective layer of titanium oxide, nickel-chrome or other materials that reflect visible light. The reflective capacity of the film may be set via the layer thickness of the reflective layer.

The output unit may include other features such as a protective layer (for example, to protect against mechanical stress), a heatable layer (for example, to heat rear view devices arranged outside the passenger compartment), or an integrated antenna such as in the protective layer or the partially reflective film. Additionally, the protective layer and/or the partially reflective film may include milled or etched so-called icons, images and/or warnings and/or symbols, such as a compass, time, etc.

In another aspect, a motor vehicle includes at least one rear view device. The term "motor vehicles may re"late to all motorized vehicles with rear view devices.

In another aspect, a method for operating a rear view device including a camera arrangement, an output unit connected to the camera arrangement which is partially reflective at least in sections, and a control unit, may include the steps of: recording a rear traffic situation with the camera arrangement; showing the rear traffic situation recorded with the camera arrangement as a camera image for a driver of the motor vehicle on the output unit with suitable image properties, which render a conventional mirror image of the partially reflective output unit at least mainly invisible; determining a degree of impairment of the camera image by the control unit; automatically controlling the output unit by the control unit so that, when a predetermined degree of impairment is exceeded, the camera image is no longer shown on the output unit; visibly showing of the rear traffic situation at least in sections on the output unit by means of the conventional mirror image of the rear traffic situation.

The output unit may be a screen or monitor, for example.

The method for operating a rear view device for a motor vehicle may make it possible that with an impairment of the camera image that is not tolerable for the comprehensive observation of the rear traffic situation, a loss of the opportunity for observing the rear traffic situation does not occur, and the occurrence of the resulting critical traffic situations is avoided.

The degree of impairment of the camera image may be caused by contamination on the camera arrangement.

The degree of contamination of the camera image in a two-dimensional arrangement on measurement areas in the camera image may be determined separately for each measurement area by the control unit.

The control unit may regard one of the measurement areas as being unreliable when the predetermined degree of impairment for this measurement area is exceeded. The impermissible impairment can, for example, be caused by local dirt on the camera arrangement relating to the corresponding measurement area in the camera image by image errors due to electronic faults or by pixel errors in the output unit.

The control unit may no longer show the camera image on the output unit when 20% or more of the measurement areas are regarded as being impermissibly impaired, or when 10% or more of the measurement areas in the central main field are regarded as being impermissibly impaired.

The method may further include the additional step that the camera image is no longer shown on the output unit if an interference that is not caused by contamination, which may impair the observation of the rear traffic situation, is present.

The control unit may detect a removal of the contamination or the interference not caused by contamination and in response, switch the output unit back on. Thus, the representation of the rear traffic situation can be switched back to electronic display without any loss of time.

When the output unit is switched off or in standby mode, the control unit may continue to check the camera images frame by frame in order to determine a removal of the dirt or the interference not caused by contamination. Thus, it can be determined without a time delay whether the impairment of the camera image is still present or whether it has been removed.

The driver of the motor vehicle may manually enter whether the rear view device should be operated in an electronic mode by means of representation of the rear traffic situation recorded with the camera arrangement as a camera image or in a reflecting mode by means of visible display of the rear traffic situation, at least in sections, on the output unit by means of the conventional mirror image, where, when the motor vehicle is first put into operation, the electronic mode is always set as the standard mode. Thus, the driver may retain control over the display mode for the rear traffic situation.

BRIEF DESCRIPTION OF THE SEVERAL VIEWS OF THE DRAWINGS

Further design examples are explained with reference to the attached schematic drawings. They show:

FIG. 1b is a further representation of the interior mirror from FIG. 1a;

FIG. 2a is a plan view of a pivotable interior mirror for a motor vehicle according to a second embodiment according to the invention;

FIG. 2b is a sectional view though a wedge mirror in the interior mirror from FIG. 2a;

FIG. 2c is an enlargement of a section A from FIG. 2a;

DETAILED DESCRIPTION OF THE INVENTION

Figure 1A:
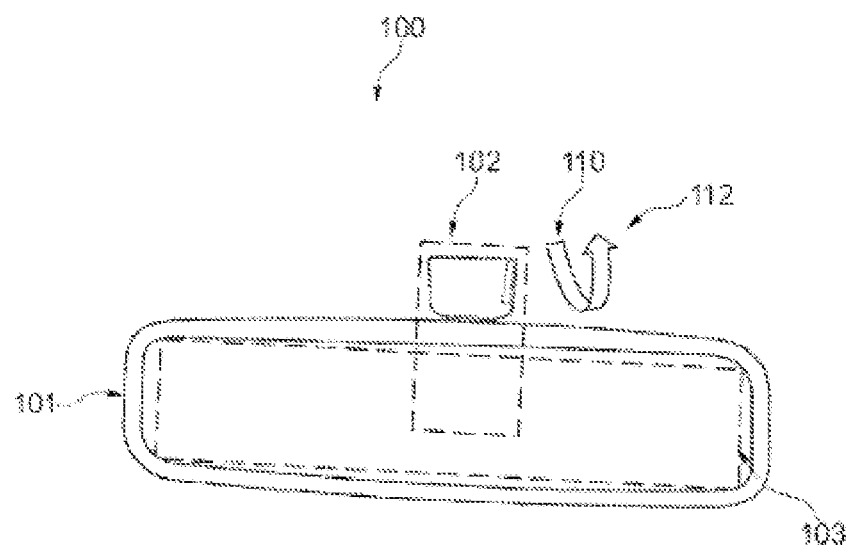
FIG. 1a is a representation of a pivotable interior mirror for a motor vehicle according to a first embodiment according to the invention.

FIG. 1a shows a schematic representation of a pivotable interior mirror 100 for a motor vehicle according to a first embodiment of the invention. The pivotable interior mirror 100 comprises a frame 101, a pivoting device 102 and a control unit 103. The pivoting device 102 can thereby move the interior mirror 100 including its wedge mirror 104 from a normal position 110 to a dimming position 112. The normal position 110 can be the position shown in FIG. 1a, in which the driver can easily identify vehicles driving behind them in daylight in the interior mirror 100. The dimming position 112 can be a position in which the degree to which the driver is dazzled by the headlights of vehicles following them reflected by the interior mirror 100 when driving at night is at least reduced. The dimming position 112 can thereby be a position in which the entire interior mirror 100, as shown in FIG. 1a, is turned upward so that the reflected beam path from the lights of another vehicle driving behind the motor vehicle to the driver's eyes is interrupted. The dimming position 112 can also be a position in which only the wedge mirror 104 is pivoted, including to one side or downward. A variety of angles of rotation or folding angles are possible.

The control unit 103 can be used by the driver to activate the pivoting device 102, in particular in response to a movement or gesture by the driver. The movement can be a movement of an arm or a hand towards the control unit 103. For example, the control unit 103 can react to a certain speed at which the driver's hand moves towards to control unit 103.

In an embodiment according to the invention, the pivoting device 102 can comprise a first shape memory actuator with which the interior mirror 100 can be moved into the dimming position 112. Such a shape memory actuator can comprise a shape memory alloy—SMA. It can thereby be a metal alloy which can exist in two different crystalline structures so that the first shape memory actuator remembers a previous shape despite significant subsequent shaping and can shift back to its original shape. The original shape can be the normal position 110, and the deformed shape can ensure the dimming position 112.

In a beneficial embodiment of the invention, the first shape memory actuator can comprise a shape memory wire, the length of which changes in response to a current flow through the shape memory wire. The current flow through the wire can cause a temperature increase in the wire so that it can extend. The control unit 103 can thus supply the shape memory wire with current in response to the driver's movement, for example through connection to the power supply in the motor vehicle. The shape memory wire can be coiled on a first thread roll and cause a rotational movement of the first thread roll in response to a current flow, for example as described below in FIGS. 3 to 7. The first thread roll can thereby form a drive axle of the interior mirror 100 and turn the interior mirror 100 by a first angle of rotation. The shape memory wire can also be coiled on a second thread roll which can turn the interior mirror 100 by a second angle of rotation. Thereby, the diameter of the second thread roll can differ from the diameter of the first thread roll, for example as described below in FIGS. 3 to 7.

The pivoting device 102 can include a further actuator which can move the interior mirror 100 from the dimming position 112 back into the normal position 110. The further actuator can thereby comprise a second shape memory actuator which can be constructed in the same manner as the first shape memory actuator described above.

It is also possible for the two shape memory actuators to be controlled independently of one another. The second shape memory actuator can therefore move the interior mirror 100 back into the normal position 110 after a certain amount of time. Alternatively, the second shape memory actuator can move the interior mirror 100 back into the normal position 110 depending on a glare situation, detectable by a sensor device for example, wherein this movement can also be detected by the sensor device. It is also possible for the second shape memory actuator to move the interior mirror 100 back into the normal position 110 in response to a movement by the driver. In one embodiment, the second shape memory actuator can move the interior mirror 100 back into the normal position 110 depending on cooling of the shape memory wire.

The further actuator can beneficially have a spring element. As a result, the spring element can move the interior mirror 100 back into the normal position 110 depending on cooling of the shape memory wire in the first shape memory actuator. The force of the spring element can in particular be judged against the force of the expansion of the shape memory wire in the first shape memory actuator in order to cause a slow return to the normal position 120 when the wire cools.

According to the invention, it is preferred that the control unit 103 has at least one sensor in the sensor device in order to be able to detect a movement by the driver, in particular an arm movement by the driver towards the interior mirror. The control unit 103 can thereby activate the pivoting device 102 according to a threshold value for the driver movement detected. For example, the pivoting device 102 can be activated so that the interior mirror 100 can move into the dimming position 112 when a predefined threshold value is exceeded.

Figure 1B:
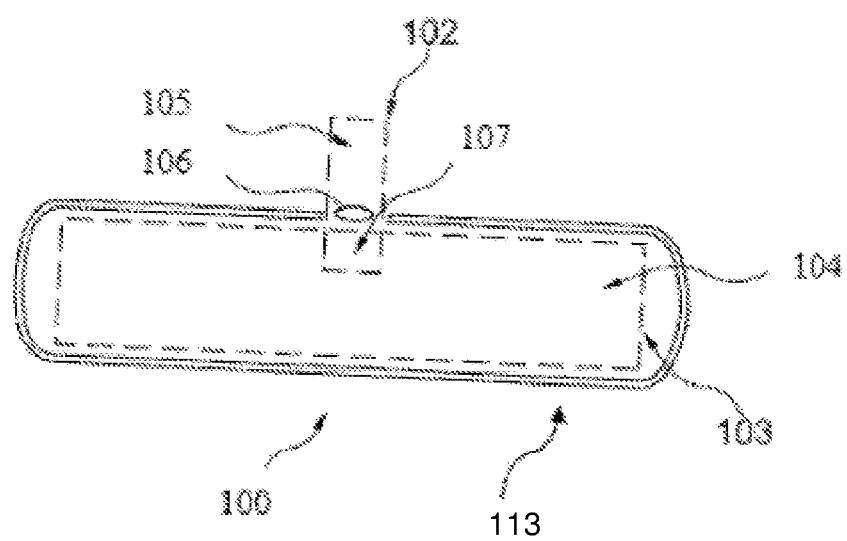

FIG. 1b shows a schematic representation of a gesture-controlled interior mirror 100 which, in accordance with FIG. 1a, comprises a pivoting device 102, a control unit 103, 107 and a wedge mirror 104. In this embodiment, the interior mirror also has an SMA wire actuator and is equipped with a sensor device in order to implement dimming using gesture control. The interior mirror 100 can thereby be turned down using a rotational movement such that the driver is no longer dazzled and the movement can be accomplished automatically by the pivoting device 102, even silently. In one embodiment, the driver can cause the interior mirror 100 to turn down, up or to the side not only from the normal position shown in FIG. 1b into a dimming position, not shown, but also back again using a hand movement or gesture, or even through proximity.

A possible interaction by the driver with the interior mirror 100 causing a movement of the interior mirror 100 is described below. When the driver makes a movement 113 in a specific manner in a first detection area of the control unit 103, also known as the gesture channel, the angle between a mirror mounting 105 and the wedge mirror 104 can change to the effect that a first surface of the wedge mirror 104 facing the driver shows a little more upwards to the roof of the motor vehicle so that the driver is no longer dazzled. The actuator for the pivoting device 102, which can be located behind the wedge mirror 104 in the interior mirror 100, can ensure this automatic movement. If the actuator is an SMA actuator in which the wire, which is located behind the wedge mirror 104, can be supplied with current when a gesture by the driver is detected by the sensor device in the control unit 103, the wire can heat up and shorten as a result, which is converted into a rotational movement at the pivot point 106 of the interior mirror 100. A further movement in the gesture channel for the sensor device can ensure that the interior mirror 100 turns back. Alternatively, rotating back can be compelled by the actuation of a virtual button in a second detection area of the control unit 107. The second detection area can thereby by located closer to the mirror surface of the wedge mirror 104 than the first detection area in order to better simulate a button.

Figure 2:
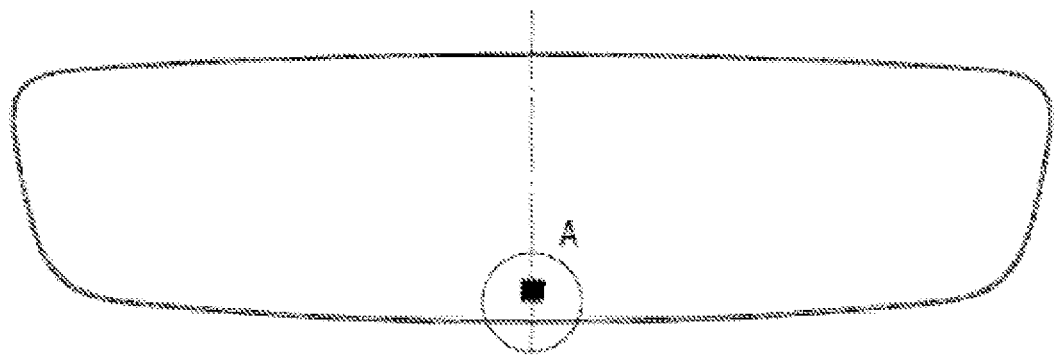
Figure 2:
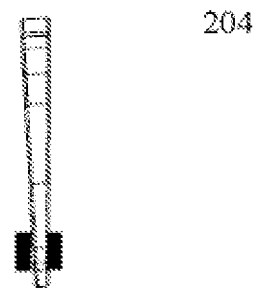
Figure 2:
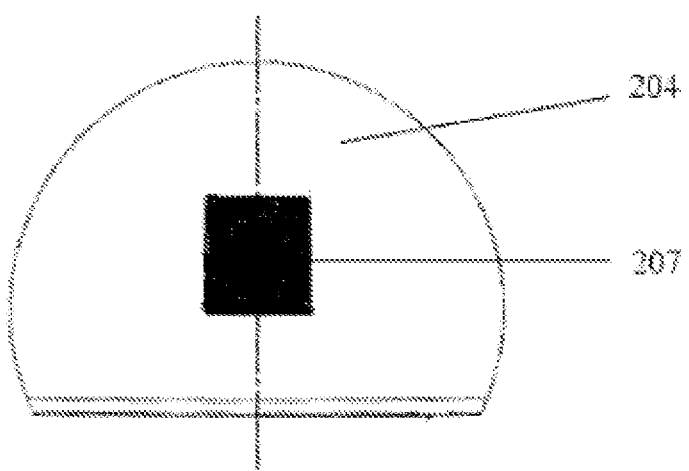

FIGS. 2a to 2c show a further interior mirror 200 according to the invention which includes an adjustable wedge mirror 204 and a sensor device 207. The wedge shape of the wedge mirror can be seen best in FIG. 2b. FIG. 2b also shows that the sensor device 207 includes a first sensor 208 on the first, mirrored surface of the wedge mirror 204 facing the driver, while a second sensor 209 is attached to the rear of the wedge mirror 204. The first sensor 208 can be a TOF sensor with ALS function, while the second sensor only needs to fulfil an ALS function. This opens up a broad spectrum for the activation of a pivoting device, not shown, which can however correspond to the pivoting device described in connection with FIGS. 1a and 1b. The sensors 208 and 209 can also be designed rolled into one.

Using the sensor 208, gesture control is possible on the one hand, namely for movements at a distance of more than 10 mm away from the wedge mirror 204. Within the range of 10 mm to the wedge mirror, a button function is performed with which, for example, gesture control of the pivoting device can be switched to fully automated control. For a fully automated solution, the first sensor 208 detects whether there is a glare situation and the wedge mirror 204 should be turned to its dimming position. Consideration of the output data from the second sensor 209 also allows the ambient light, so the light which is perceived through the windscreen of the motor vehicle, not shown, by the driver, to be taken into account. The output signals from the two sensor 208 and 209 can be evaluated together, for example using a differential circuit, in order to thus take special driving situations such as those which occur when driving into a tunnel and leaving a tunnel into account. Differentiation between day and night is therefore possibly through the second sensor 209. This differentiation can be taken into account when the wedge mirror 204 is turned, namely in connection with a threshold which needs to be exceeded to trigger turning and/or for a turning angle.

It is also possible according to the invention for the pivoting device to be operated not only depending on the output signals from the sensor device 207 but also taking into account additional signals such as information about a headlights and/or time signals using which it is also possible to determine whether it is day or night.

Figure 3:
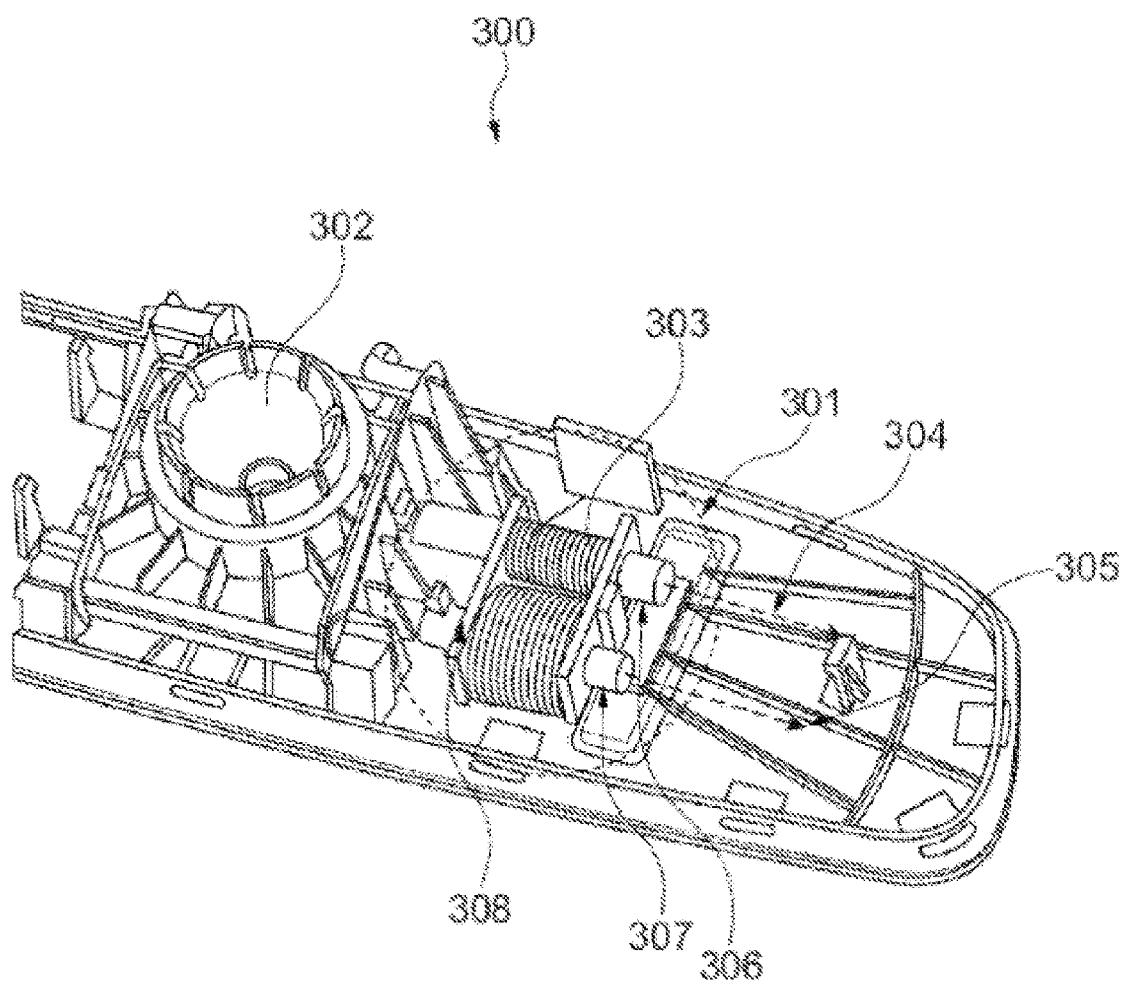
FIG. 3 is a three-dimensional representation of a gesture-controlled, pivotable interior mirror for a motor vehicle according to a third embodiment according to the invention.

FIG. 3 shows a three-dimensional representation of a gesture-controlled interior mirror 300 for a motor vehicle according to a further embodiment of the invention. The interior mirror 300 can have a design corresponding to the interior mirror 100 from FIG. 1a or 1b, or comprise the interior mirror 200 from FIGS. 2a to 2c. The housing of the interior mirror 300 is shown open in FIG. 3 so that various mechanical components which are located within the housing, not shown, are visible. The wedge mirror is attached to the side of a support plate 309 which is facing away from the observer and therefore not visible.

The interior mirror 300 has a drive 301 with which a ball joint 302 (shown in FIG. 3 by a calotte section and a spherical calotte or spherical bearing plate) can be turned in order to turn the interior mirror 300 accordingly. The drive 303 comprises an SMA wire and is designed as a yo-yo drive. A yo drive turns only in one direction while the other direction is pulled back with a spring, while a yo-yo drive has a second coil which turns in precisely the opposite direction so that the yo-yo drive can turn in both directions. In the embodiment in FIG. 3, the drive 301 comprises a first axle 304 and a second axle 305. The first axle 304 can be equipped with two coils which turn in different directions in order to implement a yo-yo drive. The second axle 305 can also be equipped with two coils which turn in different directions in order to implement a yo-yo drive.

The drive 301 in the pivoting device can perform a rotation of at least 90° and replaces a manual lever in a conventional dimming device. In the embodiment in FIG. 3, the drive 301 comprises 2 axles 304, 305, although more than two axles are also possible as well as just one axle 304. However, for a rotation of 90°, 2 axles are generally sufficient.

In the embodiment in FIG. 3, the drive 301 has two stable points at the end of the axles 304, 305 which engage with the calotte section of the ball joint 302. Accidental adjustment after rotation can thus be prevented.

The SMA wires 303 are coiled on the rolls 306, 307 which are arranged towards the two axles 304, 305 and can be heated by current pulses and thus shorten in order to perform a rotation of 90°.

The drive 301 comprises a support plate 308 which is used for fixing the wires 303 to the rolls 306, 307. The wires 303 are guided from the support plate 308 over the second roll 307 and then over the first roll 306 and are also fixed there. In one embodiment, a control unit can have its power connections on the support plate 308. The control system can then perform an exact measurement of the internal resistance in order to heat the wires 303 precisely and measure out the force.

Figure 4:
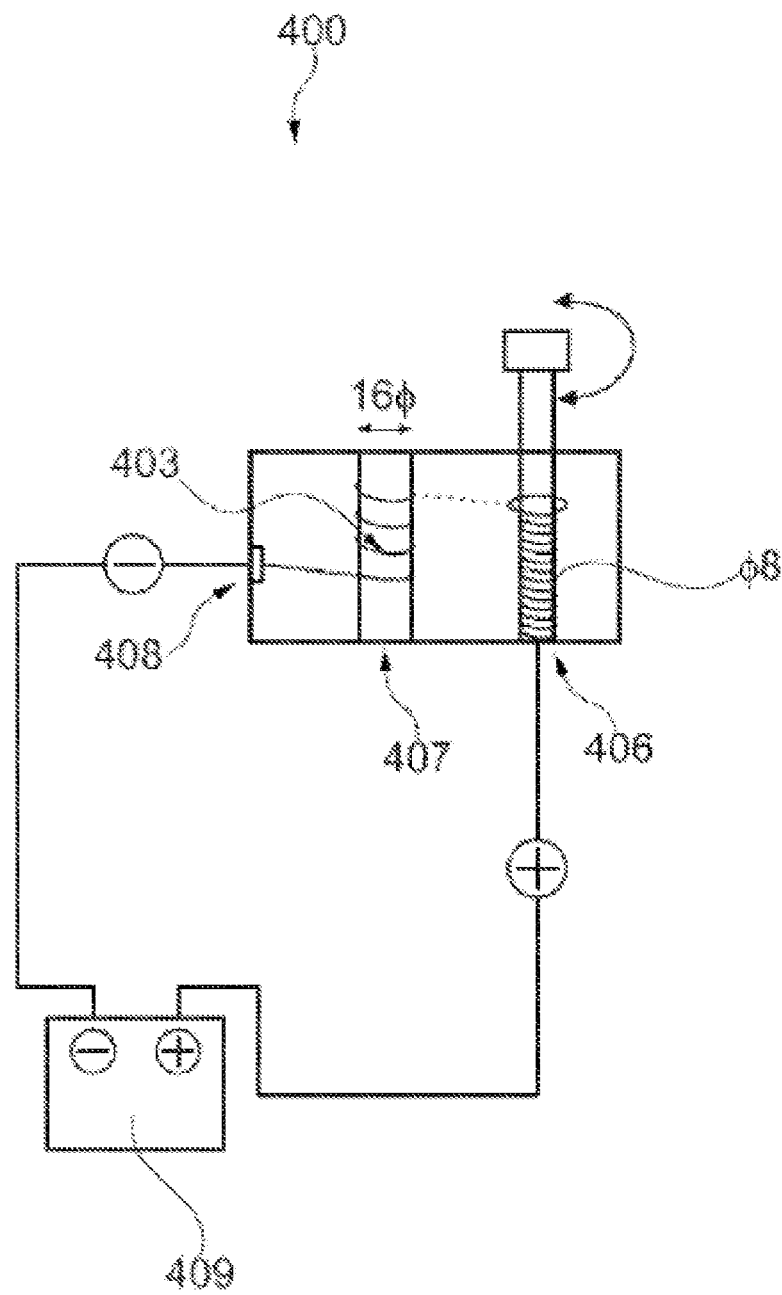
FIG. 4 is a plan view of a double axle mini yo for a gesture-controlled interior mirror according to the invention.

FIG. 4 shows a schematic representation in plan view of a two-axle mini yo 400 for a gesture-controlled interior mirror according to a further embodiment according to the invention. The mini yo 400 can be used in a drive 301 for the interior mirror 300, for example. As previously explained, the term yo means that the drive only turns in one direction and the other direction can be pulled back with a spring, for example, according to the representation in FIG. 7 for instance.

In the embodiment in FIG. 4, the mini yo comprises a first thread roll 406, corresponding for example to the first thread roll 306 shown in FIG. 3, and a second thread roll 407, corresponding for example to the second thread roll 307 shown in FIG. 3. Thereby, the second thread roll 407 is thicker than the first thread roll 406. The first thread roll 406 can, for example, have a diameter of 8 mm and the second thread roll has a diameter of 16 mm. Other thicknesses and diameters are also possible. The majority of a wire 403 forming coils is coiled onto the thicker second thread roll 407, while only a few coils are coiled onto the narrower first thread roll 406. The narrow first thread roll 406 can be designed as a drive axle and can be hollow in order to supply the wire 403 with current from the inside. The wire 403 is connected to a housing (fixation point 408 for example on a support plate 308 as described above for FIG. 3), where it is supplied with current, then transfers to the thicker second roll 407 where it has multiple coils and finally runs to the thinner first drive roll 406. There, it dips through a hole into the interior of the roll 406 and is guided outwards to a power supply 409. The power supply 409 can be provided by a car battery.

Figure 5:
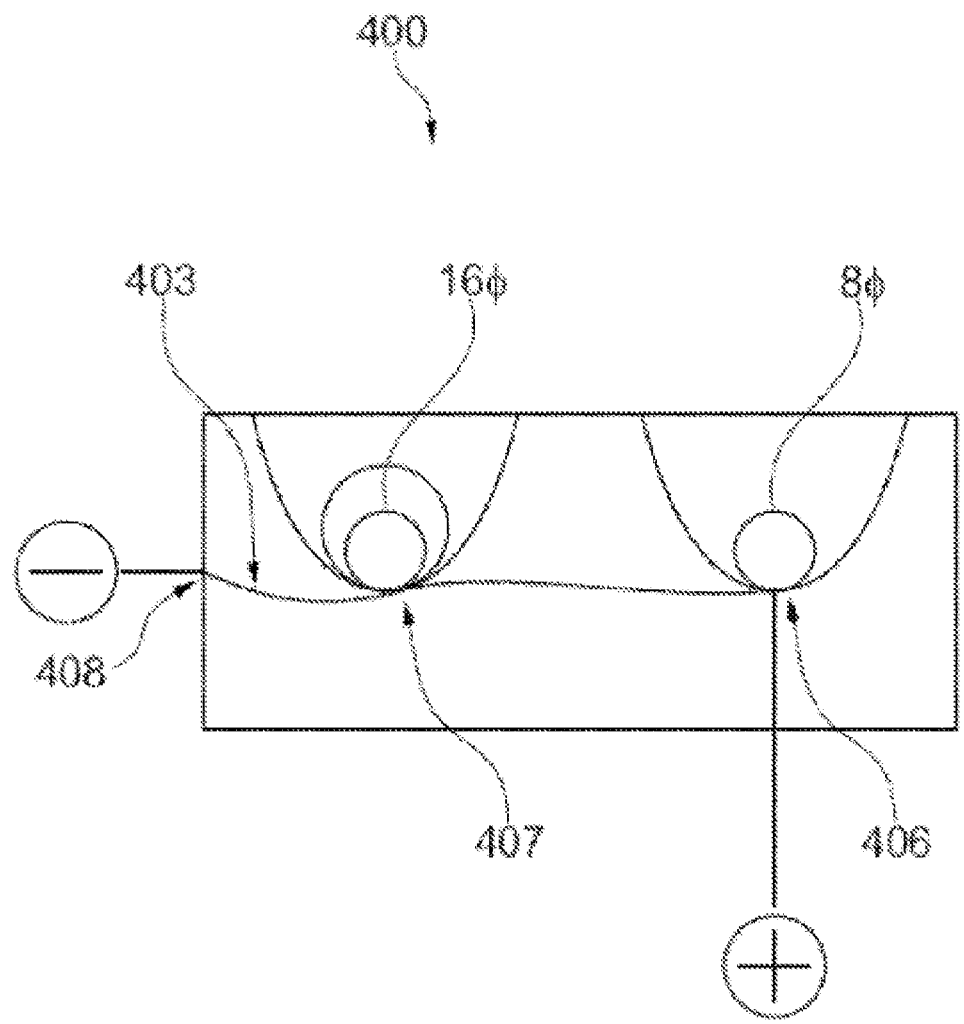
FIG. 5 is a side view of the double axle mini yo from FIG. 4.

FIG. 5 shows a schematic representation in side view of the two-axle mini yo 400 from FIG. 4. In the embodiment in FIG. 5, the wire 403 is firmly connected to the housing at the fixation point 408, where it is also supplied with current, after which it then runs over the thick second roll 407 where it has multiple coils and then continues to the narrow first drive roll 406. There, it dips into a hole in the interior of the roll 406 and is guided outward to the power supply 409. The supply cables for the power supply are labelled with the symbols "+" and "−".

Figure 6:
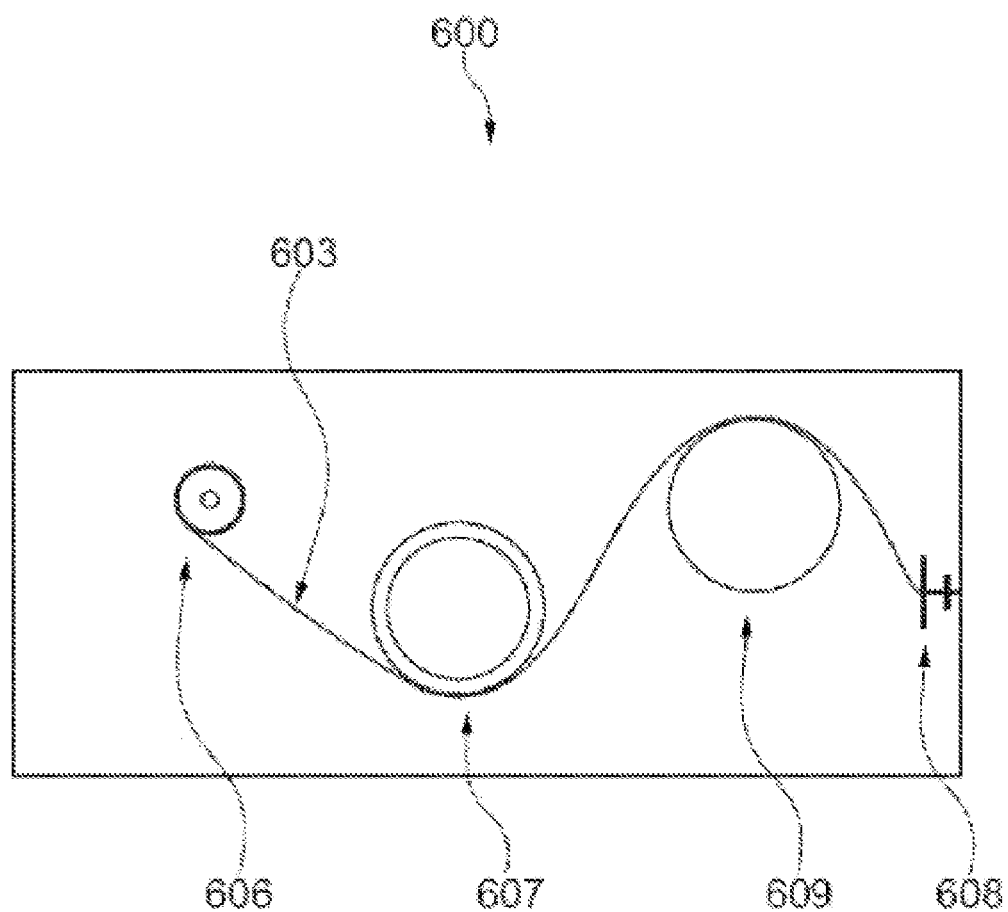
FIG. 6 is a plan view of a triple axle mini yo for a gesture-controlled interior mirror according to the invention.

FIG. 6 shows a schematic representation in plan view of a three-axle mini yo 600 for a gesture-controlled interior mirror according to a further embodiment according to the invention. The mini yo 600 can, for example, be used in a drive 301 for an interior mirror 300 as described in FIG. 3. The three-axle mini yo 600 can correspond to the two-axle mini yo from FIGS. 4 and 5 with the difference that a wire 603 is also guided over an additional third roll.

In the embodiment in FIG. 6, the wire 603 is firmly connected to the housing at a fixation point 608, where it is supplied with current, after which it then runs over the third roll 609 where is has multiple coils, on to the second roll 607 and then to the first roll 606 which can serve as a drive roll. There, it dips into a hole in the interior of the roll 606 and is guided outward to a power supply.

With the three-axle mini yo 600, a greater angle of rotation can be generated than with a two-axle mini yo. In an embodiment which is not shown in FIG. 6, the mini yo comprises additional axles in order to be able to realize an even greater angle of rotation.

The embodiments shown in FIGS. 4 to 6 can also be implemented as mini yo-yos, i.e. with two wires which each turn the opposite way to the other. Likewise, a spring element which slowly pulls the wedge mirror back into the original position can be used. In the variant with a spring element, the drive can be realized, for example, so that only the dimming position is reached using gesture control, while the original position (normal position) is automatically engaged again after a certain cooling time for the wire. In the variant with yo-yo, each gesture hand movement can define its position.

Figure 7:
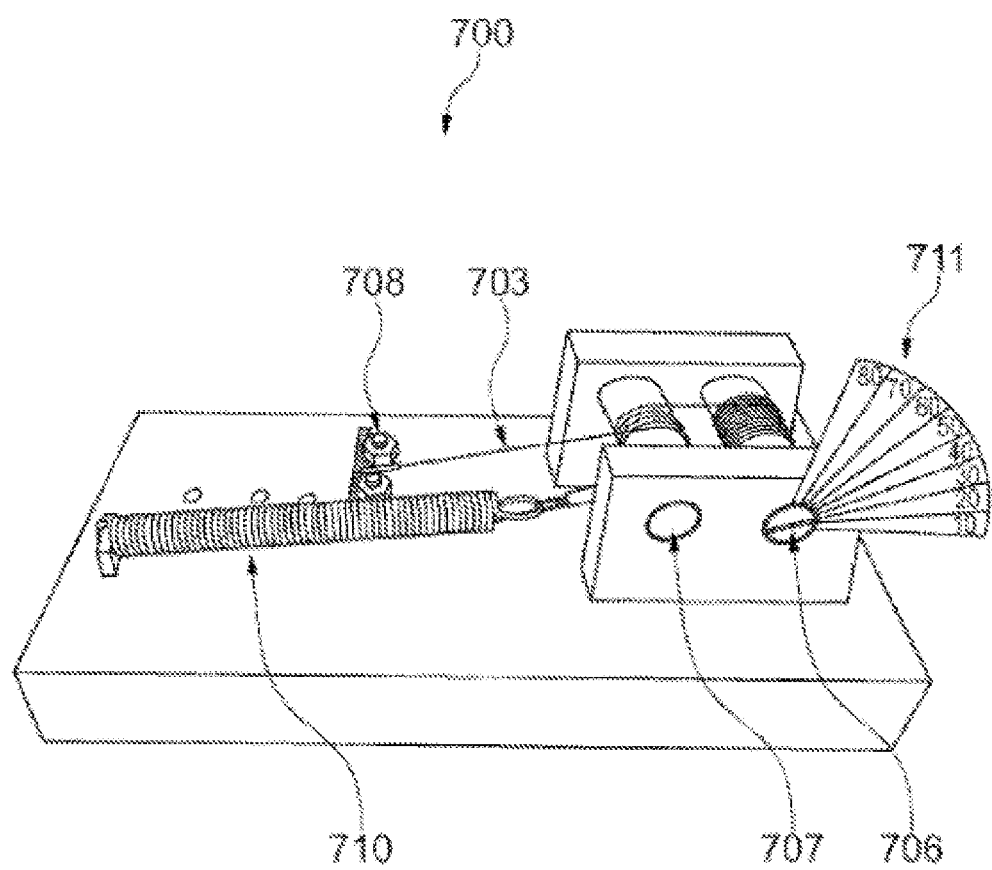
FIG. 7 is a three-dimensional representation of a drive for a gesture-controlled interior mirror which is realized as a yo with spring element.

FIG. 7 shows a three-dimensional representation of a drive 700 for a gesture-controlled interior mirror which is realized as a yo with spring element. The drive 700 can be used, for example, as a drive 301 for an interior mirror 100, 200, 300 as described in FIGS. 1 to 3.

In the embodiment in FIG. 7, a wire 703 is again firmly connected to the housing at a fixation point 708, where it is supplied with current, after which it then runs over a second roll 707 where it has multiple coils and on to a first roll 706 which can be used as a drive roll. There, it dips into a hole in the interior of the roll 706 and is guided outward to a power supply. The wire 703 with the two rolls 706, 707 forms the yo element which turns from a starting position (normal position) in one direction, while a spring element 710 causes it to turn back to the starting position. A variety of angles of rotation 711 can be realised using the drive 700, for example in a range from 0° to 90° as shown on the scale.

Figure 8A:
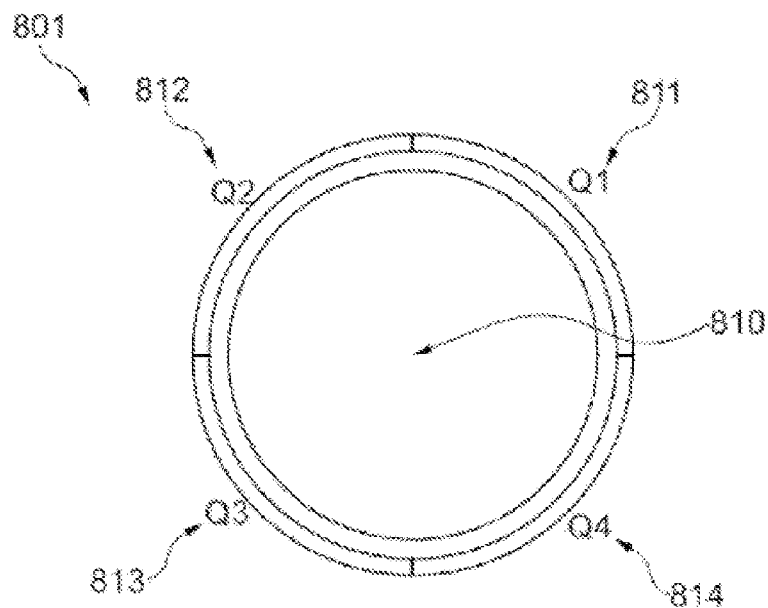
FIG. 8a is a representation of a sensor device for a gesture-controlled interior mirror according to the invention.

FIG. 8a shows a schematic representation of a first sensor 801 in a sensor device with light-emitting diodes 811, 812, 813, 814 and a TOF camera for a gesture-controlled interior mirror according to the invention. The sensor 801 can be used, for example, in an interior mirror 100, 200, 300 as described in FIGS. 1 to 3, namely as part of the control unit 103. In one embodiment, an LED array, with infrared light-emitting diodes for instance, can be used for gesture control in the interior mirror as shown in FIG. 8a.

For the LED technology shown in FIG. 8a, the LEDs 811, 812, 813, 814 can be used in order to illuminate a defined space in four quadrants Q1-Q4 and thus monitor it. The TOF camera 810 can be located in the centre as a receiver which can detect a change in the lighting conditions as a result of a movement by the driver, for example a hand movement. More precisely, for each of its pixels the TOF camera detects the time that the light emitted by the LEDs 811 to 814 takes to get to the hand and back again. This time is directly proportional to distance. As a result, gesture control can be implemented within a first predefined distance interval, while a virtual button can also be provided within the second predefined distance interval. Fully automated dimming can be engaged using a first button, for example; and dimming dependent on the motor vehicle's illumination device can be engaged using a second button, for example. A dimming position can thus be enforced in principle when the headlights are switched on and a normal position can be enforced in principle when the headlights are switched off.

The sensor 801 can detect intuitive movement patterns and control an actuator so that rotation of an interior mirror both from its normal position into its dimming position and back is possible.

Figure 8B:
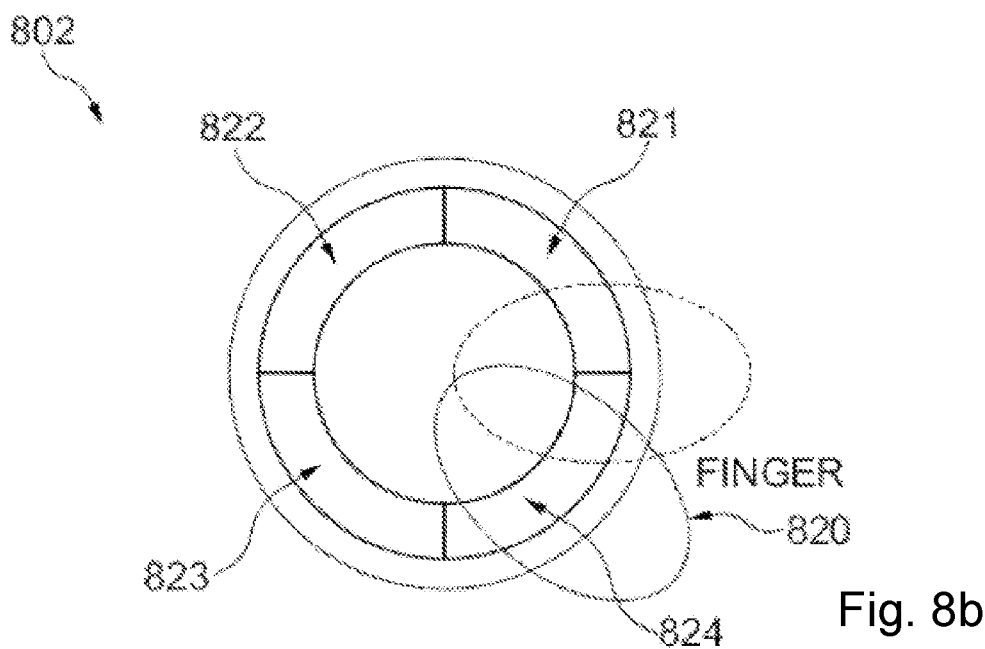
FIG. 8b is a representation of an alternative sensor device for a gesture-controlled interior mirror according to the invention.

FIG. 8b shows a schematic representation of an alternative sensor device 802 with four TOF sensors 821, 822, 823, 824 of which each detects the proximity and the position of a finger 820, for example, in a radius of up to about 20 cm and sends the corresponding X, Y and Z axis position data for the finger 820 to the electronics assembly. This can all occur in real time.

Figure 9:
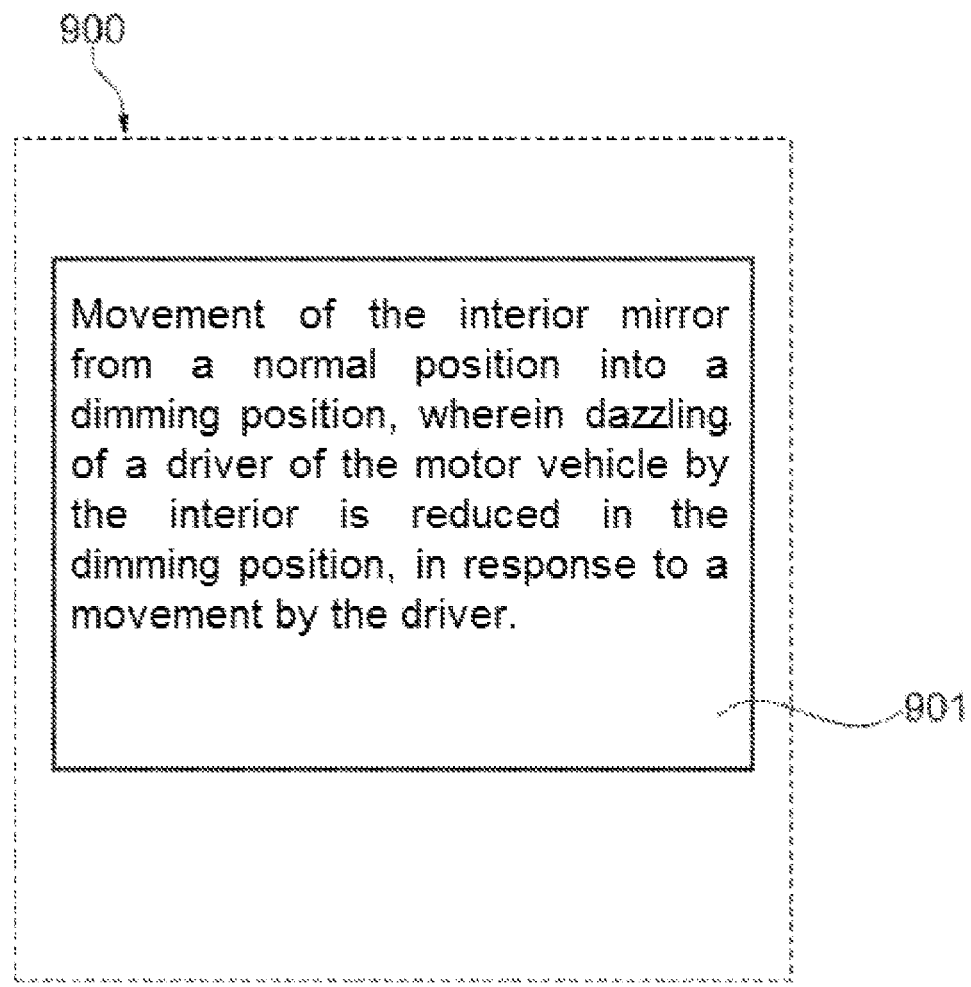
FIG. 9 is a representation of a method according to the invention for gesture-controlled pivoting of an interior mirror for a vehicle.

FIG. 9 shows a schematic representation of a method 900 according to the invention for gesture-controlled pivoting of an interior mirror for a motor vehicle. The method 900 can comprise a movement 901 of the interior mirror from a normal position into the dimming position. Thereby, the interior mirror can be moved from a normal position into the dimming position, in which dazzling of the driver of the motor vehicle by the interior mirror is reduced, in response to a movement by the driver. The movement 901 of the interior mirror can be realised corresponding to the descriptions for FIGS. 1 to 8 above.

The process step 901 can be performed by a computer program product which can be loaded directly into the internal memory in the motor vehicle's on-board computer and comprises software code segments.

Figure 10:
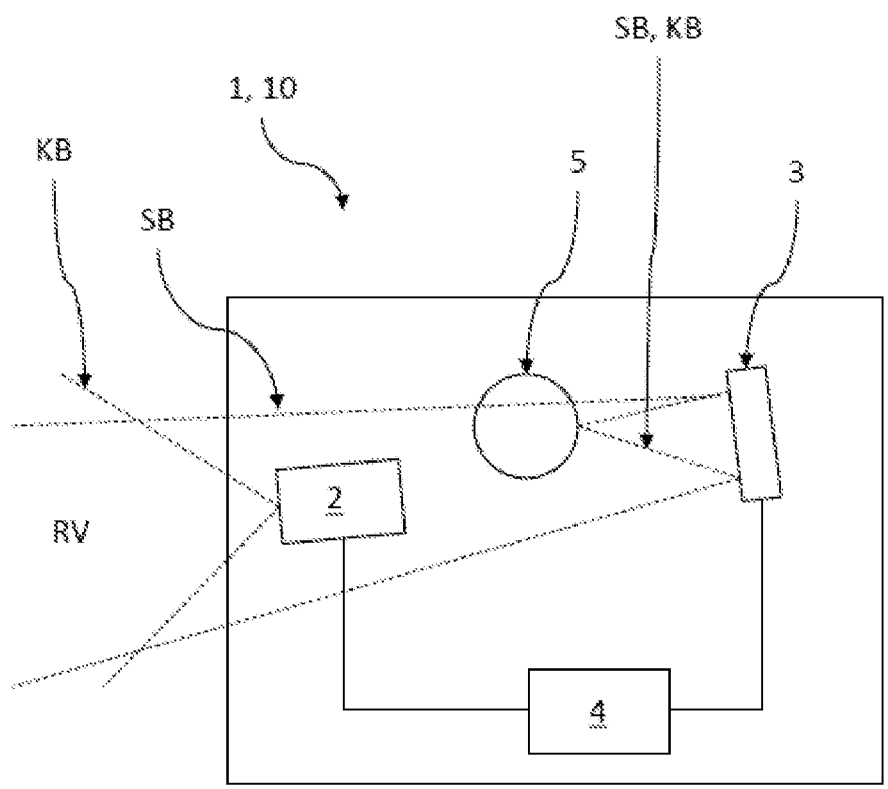
FIG. 10 is a schematic view of an embodiment of the rear view device according to the invention or the motor vehicle according to the invention with such a rear view device.

FIG. 10 illustrates a schematic view of an example of a rear view device 1 and a motor vehicle 10 with such a rear view device 1 including a camera arrangement 2 for recording a rear traffic event RV and an output unit 3 connected to the camera arrangement 2 via one or more suitable data connections (wireless or cable-supported). The output unit 3 of this example is a screen 3 on which the rear traffic situation recorded with the camera arrangement 2 is shown as a camera image KB at least for a driver 5 (here shown symbolically with a circle as the head) of the motor vehicle 10. The screen 3 may be a partially reflective screen 3 at least in sections (here over its entire surface facing the driver), which without a camera image KB shown visibly displays, as a result of its partially reflective surface, a conventional mirror image SB of the rear traffic situation RV.

When switched on, the screen 3 may show a camera image KB with image properties which render the conventional mirror image SB at least mainly invisible. In addition, the rear view device 1 includes a control unit 4, for example including a processor with an evaluation algorithm installed and implemented on it for determining a degree of impairment BG of the camera image KB.

In this example, the control unit may automatically control the screen 2 via a suitable data connection in response to a predetermined degree of impairment VBG of the camera image KB being exceeded. The control unit may control the screen 2 so that the camera image KB is no longer shown on the screen 3. In this example, the screen 3 or the camera arrangement 2 can be switched off by the control unit 4 so that no further camera signal is present or the transmission of the camera signal for displaying the camera image KB on the screen 3 can be interrupted by the control unit 4. Instead, the screen 3 then displays the rear traffic situation RV using a conventional mirror image SB for the driver. The degree of impairment BG of the camera image KB can, for example, be caused by contamination of the camera arrangement 2 where the degree of contamination determines the degree of impairment. As well as contamination, other causes may lead to an impairment of the camera image such as electronic image errors. In this example, the control unit 4 is designed to continuously determine the degree of impairment BG of the camera image KB. The screen 3 may be a full-surface partially reflective screen 3 which, when a camera image KB is not displayed, acts as a conventional mirror image SB over the entire screen 3. The control unit 4 is also provided in order to also no longer show the camera image KB on the screen 3 with other interferences that are not caused by contamination which can impair the observation of the rear traffic situation RV. Interference not caused by contamination may include an interference from the group of a low charging status of an electrical battery in an electric vehicle, a juddering camera image, a flickering camera image, a wobbly camera image, a still image, or an EMI effect.

Figure 11:
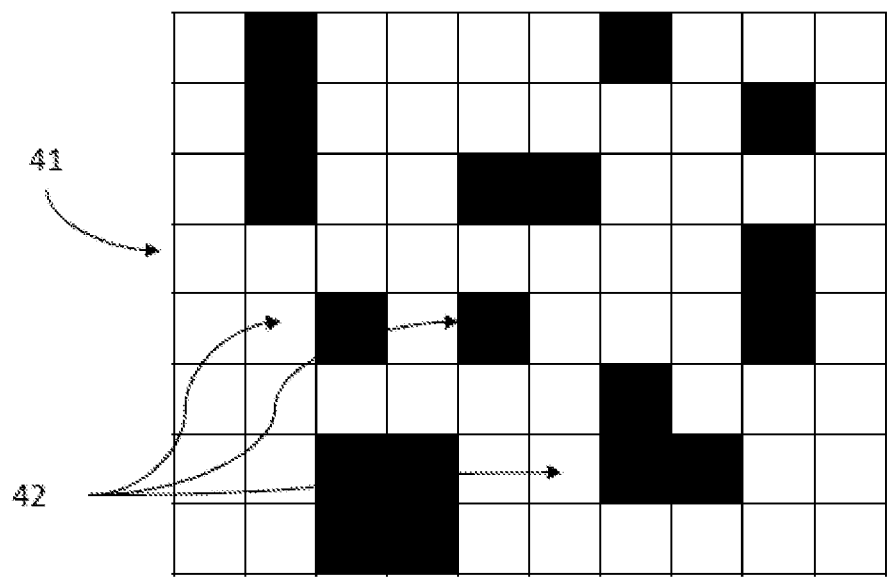
FIG. 11 is a schematic view of an embodiment of a two-dimensional arrangement of measurement areas over the entire camera image.

FIG. 11 shows a schematic view of an embodiment of a two-dimensional arrangement 41 of measurement areas 42 over the entire camera image KB which are used to determine the degree of impairment in the camera image KB. In this example, the control unit 4 is designed to separately determine the degree of impairment BG of the camera image KB in a two-dimensional arrangement 41 on measurement areas 42 in the camera image KB for each measurement area 42. Here, the two-dimensional arrangement 41 on measurement areas 42 covers the entire camera image KB. The measurement areas 42 are arranged over the camera image KB as squares or rectangles with an edge ratio between the small and large edge of more than 50%. The control unit 4 is designed to regard one of the measurement areas 42 as being impermissibly impaired (shown as a dark area as an example) when the predetermined degree of impairment VBG for this measurement area 42 is exceeded. The remaining measurement areas 42, which after the image analysis by the control unit 4 are not regarded by the control unit 4 as being impaired and thus suitable for showing the rear traffic situation RV are shown in white as an example. The control unit 4 can be designed so as to not show the camera image KB on the output unit 3 when 20% or more of the measurement areas 42 over the entire area of the analyzed camera image KB are determined to be impermissibly impaired.

Figure 12:
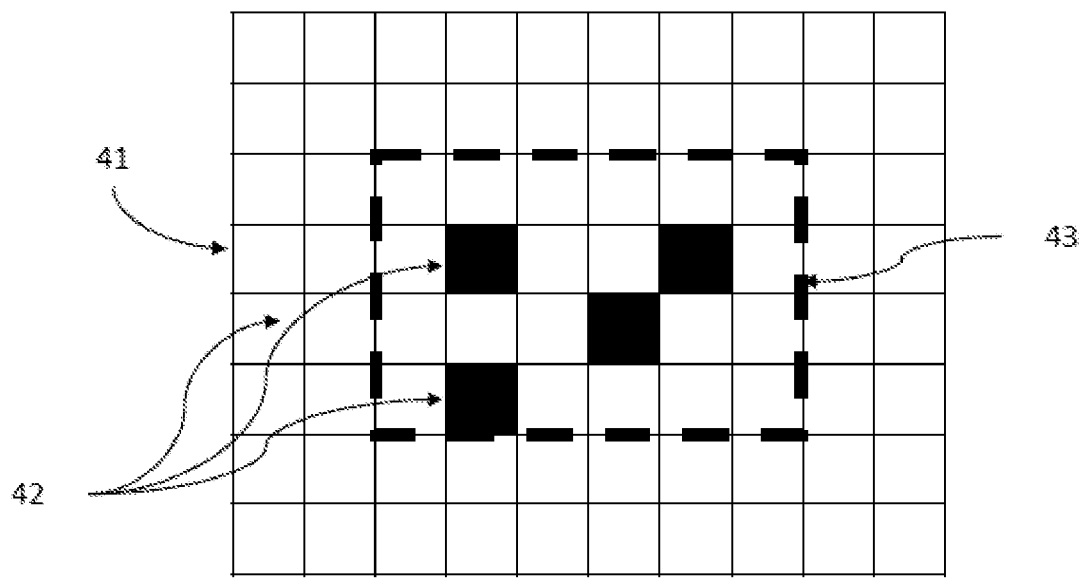
FIG. 12 is a schematic view according to FIG. 2 with a central main field of several measurement areas.

FIG. 12 shows a schematic view according to FIG. 11 with a central main field 43 of several measurement areas 42. In this example, the two-dimensional arrangement 41 includes a central main field 43 (shown in a thick black dashed line) with several measurement areas 42 which covers a central area of the camera image KB. The control unit 4 is designed to regard one of the measurement areas 42 as being impermissibly impaired (here shown as a dark area as an example) when the predetermined degree of impairment VBG for this measurement area 42 is exceeded. The remaining measurement areas 42 which after the image analysis by the control unit 4 are not regarded by the control unit 4 as being impaired and thus suitable for showing the rear traffic situation RV, are shown in white as an example. The control unit 4 may be designed so as not to show the camera image KB on the output unit 3 any longer when 10% or more of the measurement areas 42 in the central main field 43 are regarded as being impermissibly impaired.

Figure 13:
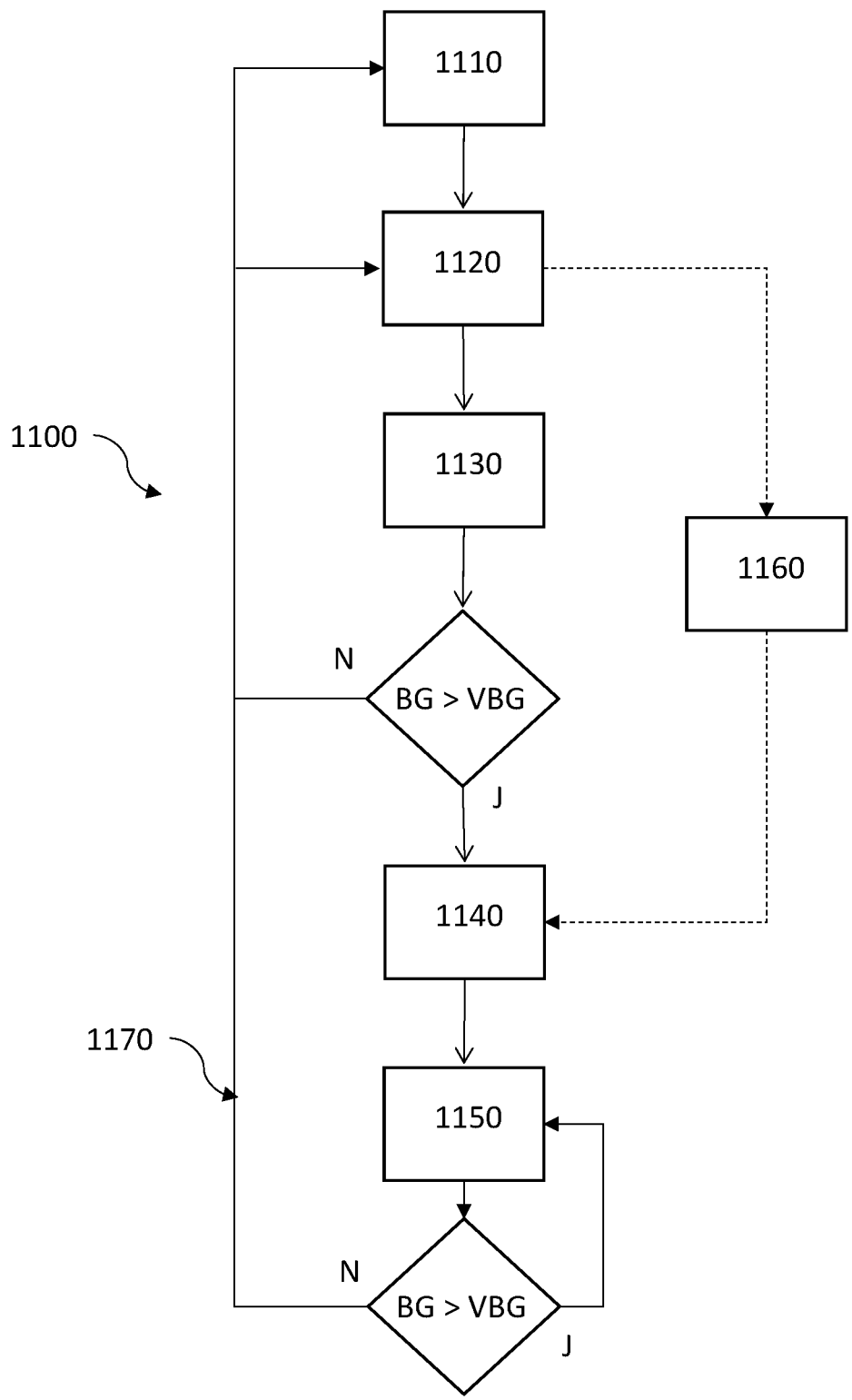
FIG. 13 is an embodiment of the method according to the invention for operating a rear view device for a motor vehicle.

FIG. 13 illustrates an example of a method 1100 for operating a rear view device 1 for a motor vehicle 10 including a camera arrangement 2, a partially reflective output unit 3 such as a screen, and a control unit 4. The method includes the steps of recording 1110 a rear traffic situation RV with the camera arrangement 2, displaying 1120 the rear traffic situation RV recorded with the camera arrangement 2 as a camera image KB for a driver 5 of the motor vehicle 10 on the output unit 3 with suitable image properties which render a conventional mirror image SB of the partially reflective output unit at least mainly invisible, determining 1130 a degree of contamination BG of the camera image KB by the control unit 4, automatically controlling 1140 the output unit 3 by the control unit 4 so that when a predetermined degree of impairment VBG (impairment BG is greater than the predetermined degree of impairment VGB=J) is exceeded, the camera image KB is no longer shown on the output unit 3 where with an impairment BG less than or equal to the predetermined degree of impairment VGB (=N) both the recording 1110 of the rear traffic situation and its representation 1120 on the output unit 3 is continued, and visibly displaying 1150 the rear traffic situation RV at least in sections on the output unit 3 using the conventional mirror image SB of the rear traffic situation RV if a value "Jis determined".

The degree of impairment BG of the camera image KB can be caused by contamination on the camera arrangement 2. The degree of impairment BG of the camera image KB can be separately determined by the control unit 4 in a two-dimensional arrangement 41 on measurement areas 42 in the camera image KB for each measurement area 42. The method may further include no longer showing 1160 the camera image KB on the output unit 3 if an interference that is not caused by contamination which may impair the observation of the rear traffic situation RV is present. In this example, when the output unit 3 is switched off or is in standby mode, the control unit 4 continues to check the camera images KB frame by frame in order to determine a removal of the dirt or the interference not caused by contamination. The control unit 4 can then regard one of the measurement areas 42 as being impermissibly impaired when the predetermined degree of impairment VBG for this measurement area 42 is exceeded.

In this example, the control unit 4 may no longer show the camera image KB on the output unit 3 when 20% or more of the measurement areas 42 are regarded as being impermissibly impaired, or when 10% or more of the measurement areas 42 in the central main field 43 are regarded as being impermissibly impaired. If the degree of impairment BG is again lower than the predetermined degree of impairment VBG, the control unit 4 detects this and in response switches the output unit 3 back on 1170. In a further example, the driver 5 of the motor vehicle 10 may further manually enter whether the rear view device 1 should be operated in an electronic mode (display 1120 of the rear traffic situation RV recorded by the camera arrangement 2 as a camera image KB) or in a reflecting mode (visible display 1150 of the rear traffic situation RV, at least in sections, on the output unit 3 by means of the conventional mirror image SB). When the motor vehicle is first put into operation, the electronic mode may always be set as the standard mode.

In another example, a motion or gesture of a driver may be detected using a TOF sensor and/or ALS sensor, or a number of other sensors as described above throughout the application. The detected user motion or gesture may switch between turning on and/or off the display recorded by the camera arrangement 2 as opposed to the reflecting mode on the output unit 3. In addition, as described throughout the application, the sensor may be capable of light propagation time measurement and part of or connected to a control unit which detects movement patterns within a first area of the interior rearview device or provides at least one virtual button within a second area of the interior rearview device. When the motor vehicle is first put into operation, the electronic mode may always be set as the standard mode. An y of the sensors and inputs described throughout this application for providing a dimming effect to a mirror may also be used, either separately or in combination, for controlling the switch between the camera display mode of the camera arrangement 2 and the reflecting mode.

It is self-evident that the features of the various embodiments described in this document can be combined with one another unless specifically stated otherwise. As shown in the description and the drawings, individual elements which have been shown in contact do not have to be in direct contact with one another; intermediate elements can be designed between the connected elements. Furthermore, it is self-evident that the embodiments of the invention can be implemented in individual circuits, partially integrated circuits or fully integrated circuits, or means of programming. The term "for example" is intended simply as an example and not as the best or optimal design. Certain embodiments have been illustrated and described here, but it is obvious to an expert in the field that a multitude of alternatives and/or similar implementations can be realized instead of the embodiments shown and described without departing from the concept of this invention.

REFERENCE LIST

1 Rear view device
2 Camera arrangement
3 Output unit (such as a screen or monitor)
4 Control unit
5 Driver of the motor vehicle
10 Motor vehicle
41 Two-dimensional arrangement of measurement areas
42 Measurement areas in the camera image
43 Central main field with several measurement fields
100 Interior mirror
101 Frame
102 Pivoting device
103 Control unit
104 Wedge mirror
105 Mirror mounting
106 Pivot point
107 Control unit
110 Normal position
112 Dimming position
113 Driver movement
200 Interior mirror
204 Wedge mirror
207 Sensor device
208 Sensor
209 Sensor
300 Interior mirror
302 Drive
302 Ball joint
303 SMA wire
304 Axle
305 Axle
306 Roll
307 Roll
308 Support plate
309 Base plate
400 Mini yo
403 Wire
406 Thread roll
407 Thread roll
408 Fixation point
409 Power supply
600 Mini yo
603 Wire
606 Roll
607 Roll
608 Fixation point
609 Roll
700 Drive
703 Wire
706 Roll
707 Roll
708 Fixation point
710 Spring element
711 Angle of rotation
801 Sensor device
802 Sensor device
810 TOF camera
811 Light-emitting diode
812 Light-emitting diode
813 Light-emitting diode
814 Light-emitting diode
820 Finger
821 TOF sensor
822 TOF sensor
823 TOF sensor
824 TOF sensor
900 Method
901 Movement
1100 Method for operating a rear view device
1110 Recording a rear traffic situation with the camera arrangement
1120 Showing the rear traffic situation recorded with the camera arrangement
1130 Determining a degree of impairment of the camera image
1140 Controlling the output unit
1150 Displaying the rear traffic situation
1160 Removing the camera image from display on the output unit
1170 Switching on of the output unit

What is claimed is:

1. A pivotable interior rearview device for a motor vehicle, comprising:
a mirror surface provided by at least one of a reflective element and a display element;
a first sensor device suitable for a light propagation time measurement for detecting at least one gesture by a driver of the motor vehicle incidence of light on the mirror surface;

a switching device for switching the display element on and off;

a pivoting device for pivoting the mirror surface from a normal position into at least one dimming position in which dazzling of the driver by light reflected in the mirror surface is reduced; and a control unit for controlling at least one of the switching device and the pivoting device, wherein at least one of the pivoting device and the switching can be activated depending on at least one output signal from the first sensor device, the first sensor device is capable of light propagation time measurement and is part of or connected to the control unit which detects movement patterns within a first area of the interior rearview device or provides at least one virtual button within a second area of the interior rearview device, a second senor device is part of or connected to the control unit and comprises at least one of a primary second sensor which is a glare sensor and a secondary second sensor configured to function as an Ambient Light Sensor (ALS), and at least one of:
  the pivoting device is activated depending on at least one output signal from the first sensor device, in particular from a primary first sensor, and the switching device is activated depending on at least one of the position of the mirror surface and at least one output signal from the second sensor device, in particular from a primary second sensor, or
  the pivoting device is activated depending on at least one output signal from the second sensor device, in particular from a primary second sensor, and the switching device is activated depending on at least one of the position of the mirror surface and at least one output signal from the first sensor device, in particular from the primary first sensor, or
  the switching device is activated depending on at least one output signal from the first sensor device, in particular from a primary first second, and the pivoting device is not activated or activated depending on at least one output signal from the second sensor device, in particular from a primary second sensor.

2. The pivotable interior rearview device of claim 1, wherein the display element is on in the dimming position.

3. The pivotable interior rearview device of claim 1, wherein the reflective element is at least partly arranged on the display element such that the driver has a direct view of the reflective element, and the reflective element is at least partly translucent such that a display on the display element can be viewed by the driver.

4. The pivotable interior rearview device of claim 1, wherein a third sensor device is part of or connected to the control unit and comprises at least one camera, and the display on the display element depends on at least one output signal from the third sensor device.

5. The pivotable interior rearview device of claim 1, wherein
  the first sensor device is attached to the side of the interior rearview device at the mirror surface, and attached to the mirror surface, or
  a primary second sensor is attached to the side of the interior rearview device at the mirror surface, and attached to the mirror surface, or
  a secondary second sensor is attached to the side of the interior rearview device opposite the mirror surface, and attached opposite the mirror surface, wherein the first sensor and the primary second sensor are rolled into one.

6. The pivotable interior mirror according to claim 1, wherein
  the pivoting device can be activated in dependence on a comparison of output signals from the first and at least one second sensor, through subtraction, or
  the pivoting device can be activated in dependence on a comparison of output signals from a primary second and a secondary second sensor, through subtraction.

7. The pivotable interior mirror according to claim 1, wherein the pivoting device can be activated in dependence on signals from a device in the vehicle which is characteristic of lighting conditions in an environment of the motor vehicle, and comprising an illumination device for the motor vehicle in the form of any one or more of headlights, vehicle interior lighting, an internal clock, or a position determination device.

8. The pivotable interior rearview device of claim 1, further comprising a third sensor device comprising the camera, wherein the control unit is configured to switch off the display device so that the reflective element provides a rear view image to the driver in response to an output signal of the third sensor device indicating that a pre-determined degree of impairment is exceeded.

9. The pivotable interior rearview device of claim 1, wherein the first sensor device comprises at least one of a primary first sensor in the form of a Time Of Flight (TOF) sensor comprising a TOF camera, and a secondary first sensor configured to function as an Ambient Light Sensor (ALS).

10. The pivotable interior rearview device of claim 9, wherein the pivoting device and the switching device are activated depending on at least one output signal from the first sensor device.

11. The pivotable interior mirror according to claim 1, wherein the control unit detects movement patterns within a first distance interval from the mirror surface or provides at least one virtual button within a second distance interval, wherein the first distance interval is provided in the first area of the control unit and the second distance interval is provided in the second area of the control unit.

12. The pivotable interior mirror according to claim 11, wherein the second distance interval is located closer to the mirror surface than the first distance interval.

13. The pivotable interior mirror according to claim 1, wherein
  the pivoting device comprises a shape memory actuator for pivoting the mirror surface, and
  the shape memory actuator comprises a shape memory wire which changes in length in response to a current flow through the shape memory wire.

14. The pivotable interior mirror according to claim 13, wherein the control unit supplies the shape memory wire with power from a power supply in the motor vehicle.

15. The pivotable interior mirror according to claim 13, wherein
  the pivoting device comprises a further actuator which moves the mirror surface back into the normal position, wherein the further actuator comprises a second shape memory actuator or a spring element.

16. The pivotable interior mirror according to claim 13, wherein
  the shape memory wire is coiled on a first thread roll and causes a rotational movement of the first thread roll in response to the current flow, and the first thread roll forms a drive axle for the interior mirror and is designed to turn the mirror surface by at least a first angle of rotation.

17. The pivotable interior mirror according to claim 16, wherein
the shape memory wire is coiled on a second thread roll which turns the mirror surface by at least a second angle of rotation, and
wherein the diameter of the second thread roll is different from the diameter of the first thread roll.

18. A method of using a pivotable interior rearview device comprising:
providing the pivotable interior rearview device, which comprises:
a mirror surface provided by at least one of the reflective element and a display element;
a first sensor device suitable for a light propagation time measurement for detecting at least on gesture by a driver of the motor vehicle incidence of a light on the mirror surface;
a switching device for switching the display element on and off;
a pivoting device for pivoting the mirror surface from a normal position into at least one dimming position in which dazzling of the driver by light reflected in the mirror surface is reduced; and
a control unit for controlling at least one of the switching device and the pivoting device,
wherein at least one of the pivoting device and the switching can be activated depending on at least one output signal from the first sensor device,
the first sensor device is capable of light propagation time measurement and is part of or connected to the control unit which detects movement patterns within a first area of the interior rearview device or provides at least one virtual button within a second area of the interior rearview device,
a second sensor device is part of or connected to the control unit and comprises at least one of a primary second sensor which is a glare sensor and a secondary second sensor configured to function as an Ambient Light Sensor (ALS), and
at least one of:
the pivoting device is activated depending on at least one output signal from the first sensor device, in particular from a primary first sensor, and the switching device is activated depending on at least one of the position of the mirror surface and at least one output signal from the second sensor device, in particular from a primary second sensor, or
the pivoting device is activated depending on at least one output signal from the second sensor device, in particular from a primary second sensor, and the switching device is activated depending on at least one of the position of the mirror surface and at least one output signal from the first sensor device, in particular from a primary first sensor, or
the switching device is activated depending on at least one output signal from the first sensor device, in particular from a primary first second, and the pivoting device is not activated or activated depending on at least one output signal from the second sensor device, in particular from a primary second sensor;
recording a rear traffic situation using a camera arrangement with at least a camera;
displaying the rear traffic situation recorded with the camera arrangement as a camera image for a driver on a partially reflective output unit with at least the mirror surface with suitable image properties which render a reflective image of the partially reflective output unit at least mostly invisible;
determining a degree of impairment of the camera image by the control unit;
automatically controlling the mirror surface using the control unit so that, in response to a predetermined degree of impairment being exceeded, the camera image is no longer displayed on the mirror surface; and
visibly displaying the rear traffic situation, at least in sections on the mirror surface, using the reflective image of the rear traffic situation.

19. The method according to claim 18, further comprising controlling the pivoting device and the switching device in response to at least one output signal from the first sensor device.

20. The method according to claim 18, further comprising
controlling the pivoting device in response to at least one output signal from the first sensor device, in particular from a primary first sensor; and
controlling the switching device in response to at least one of the position of the mirror surface and at least one output signal from the second sensor device, in particular from a primary second sensor.

21. The method according to claim 18, further comprising
controlling the pivoting device in response to at least one output signal from the second sensor device, in particular from a primary second sensor; and
controlling the switching device in response to at least one of the position of the mirror surface and at least one output signal from the first sensor device, in particular from a primary first sensor.

22. The method according to claim 18, further comprising
activating or deactivating the pivoting device in response to at least one output signal from the second sensor device, in particular from a primary second sensor; and
controlling the switching device in response to at least one output signal from the first sensor device, in particular from a primary first sensor.

23. The method according to claim 18, wherein the degree of impairment of the camera image is caused by contamination of the camera arrangement, or an interference which is not caused by a contamination but may impair observation of the rear traffic situation results in removing the camera image from display on the mirror surface.

24. The method according to claim 18, wherein a driver manually enters whether the rear view device should be operated in an electronic mode by displaying the rear traffic situation recorded with the camera arrangement as a camera image or in a reflecting mode by visibly displaying the rear traffic situation on the mirror surface, wherein, when the motor vehicle is first put into operation, the electronic mode is always set as standard.

25. The method according to claim 18, wherein the pivotable interior rearview device further comprises a third sensor device comprising the camera, and the method further comprises switching off the display device so that the reflective element provides a rear view image to the driver in response to an output signal of the third sensor device indicating that a pre-determined degree of impairment is exceeded.

26. The method according to claim 18, wherein a driver motion or gesture determines whether the rear view device is operated in an electronic mode by displaying the rear traffic situation recorded with the camera arrangement as a camera image or in a reflecting mode by visibly displaying the rear traffic situation on the mirror surface, wherein, when the motor vehicle is first put into operation, the electronic mode is always set as standard.

27. The method according to claim 26, wherein the driver motion or gesture is determined depending on at least one output signal from the first sensor device.

28. The method according to claim 18, wherein the degree of impairment of the camera image is separately determined by the control unit in a two-dimensional arrangement on measurement areas in the camera image for each measurement area.

29. The method according to claim 28, wherein the control unit regards one of the measurement areas as being impermissibly impaired when the predetermined degree of impairment for this measurement area is exceeded.

30. The method according to claim 28, wherein the control unit no longer shows the camera image on the output unit in response to 20% or more of the measurement areas being regarded as impermissibly impaired, or in response to 10% or more of the measurement areas in the central main field being regarded as being impermissibly impaired.

31. The method according to claim 28, wherein the control unit detects a removal of a contamination or the interference not caused by contamination and in response switches the mirror surface back on to display the camera image.

32. The method according to claim 31, wherein, in response the mirror surface is switched off or in standby mode, the control unit continues to check the camera images frame by frame in order to determine a removal of the contamination or the interference not caused by contamination.

33. A method of using a pivotable interior rearview device, comprising:
  providing the pivotable interior rearview device, which comprises:
    a mirror surface provided by at least one of a reflective element and a display element;
    a first sensor device suitable for a light propagation time measurement for detecting at least one gesture by a driver of the motor vehicle incidence of light on the mirror surface;
    a switching device for switching the display element on and off;
    a pivoting device for pivoting the mirror surface from a normal position into at least one dimming position in which dazzling of the driver by light reflected in the mirror surface is reduced; and
    a control unit for controlling at least one of the switching device and the pivoting device,
    wherein at least one of the pivoting device and the switching can be activated depending on at least one output signal from the first sensor device,
    the first sensor device is capable of light propagation time measurement and is part of or connected to the control unit which detects movement patterns within a first area of the interior rearview device or provides at least one virtual button within a second area of the interior rearview device,
    a second sensor device is part of or connected to the control unit and comprises at least one of a primary second sensor which is a glare sensor and a secondary second sensor configured to function as an Ambient Light Sensor (ALS), and
  at least one of:
    the pivoting device is activated depending on at least one output signal from the first sensor device, in particular from a primary first sensor, and the switching device is activated depending on at least one of the position of the mirror surface and at least one output signal from the second sensor device, in particular from a primary second sensor, or
    the pivoting device is activated depending on at least one output signal from the second sensor device, in particular from a primary second sensor, and the switching device is activated depending on at least one of the position of the mirror surface and at least one output signal from the first sensor device, in particular from a primary first sensor, or
    the switching device is activated depending on at least one output signal from the first sensor device, in particular from a primary first second, and the pivoting device is not activated or activated depending on at least one output signal from the second sensor device, in particular from a primary second sensor;
  recording a rear traffic situation using a camera arrangement with at least a camera;
  displaying the rear traffic situation recorded with the camera arrangement as a camera image for a driver on a partially reflective output unit with at least the mirror surface with suitable image properties which render a reflective image of the partially reflective output unit at least mostly invisible;
  determining a degree of impairment of the camera image by the control unit;
  automatically controlling the mirror surface using the control unit so that, in response to a predetermined degree of impairment being exceeded, the camera image is no longer displayed on the mirror surface;
  visibly displaying the rear traffic situation, at least in sections on the mirror surface, using the reflective image of the rear traffic situation; and
  at least one of:
    controlling the pivoting device in response to at least one output signal from the second sensor device, in particular from a primary second sensor; and controlling the switching device in response to at least one of the position of the mirror surface and at least one output signal from the first sensor device, in particular from a primary first sensor; or
    controlling the pivoting device in response to at least one output signal from the second sensor device, in particular from a primary second sensor; and controlling the switching device in response to at least one of the position of the mirror surface and at least one output signal from the first sensor device, in particular from a primary first sensor; or
    activating or deactivating the pivoting device in response to at least one output signal from the second sensor device, in particular from a primary second sensor; and controlling the switching device in response to at least one output signal from the first sensor device, in particular from a primary first sensor.

* * * * *